(12) United States Patent
Dolfini

(10) Patent No.: US 11,477,696 B2
(45) Date of Patent: Oct. 18, 2022

(54) METHOD AND SYSTEM OF COOPERATION AMONG ACCESS GATEWAYS FOR BANDWIDTH SHARING

(71) Applicant: TELECOM ITALIA S.p.A., Milan (IT)

(72) Inventor: Danilo Dolfini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 60 days.

(21) Appl. No.: 16/496,549

(22) PCT Filed: Mar. 22, 2018

(86) PCT No.: PCT/EP2018/057293
§ 371 (c)(1),
(2) Date: Sep. 23, 2019

(87) PCT Pub. No.: WO2018/177879
PCT Pub. Date: Oct. 4, 2018

(65) Prior Publication Data
US 2020/0383002 A1    Dec. 3, 2020

(30) Foreign Application Priority Data

Mar. 30, 2017   (IT) .................. 102017000035316

(51) Int. Cl.
*H04W 28/08*     (2009.01)
*H04W 24/08*     (2009.01)
(Continued)

(52) U.S. Cl.
CPC ....... *H04W 28/0983* (2020.05); *H04W 24/08* (2013.01); *H04W 28/0925* (2020.05); *H04W 48/16* (2013.01); *H04W 88/16* (2013.01)

(58) Field of Classification Search
None
See application file for complete search history.

(56) References Cited

U.S. PATENT DOCUMENTS 9,648,501 B2 * 5/2017 Priotti .............. H04W 72/0493
10,848,279 B2 * 11/2020 Borean ................ H04L 5/0032
(Continued)

FOREIGN PATENT DOCUMENTS

EP           2 871 804 A1    5/2015
WO   WO 2011/113467 A1    9/2011

OTHER PUBLICATIONS

International Search Report and Written Opinion dated May 16, 2018 in PCT/EP2018/057293 filed on Mar. 22, 2018.

*Primary Examiner* — Jay L Vogel
(74) *Attorney, Agent, or Firm* — Oblon, McClelland, Maier & Neustadt, L.L.P.

(57) ABSTRACT

A method of sharing of network resources between at least two access gateways, each of the at least two access gateways providing network connectivity to user equipment, includes assessing whether a first access gateway can to share a portion of available network resources, assessing whether a second access gateway requires additional network resources to provide network connectivity to user equipment, and establishing a wireless connection between the first access gateway and the second access gateway. The first access gateway provides the portion of available network resource as additional network resources for the second access gateway. The method also includes collecting information regarding operation of the two access gateways, processing information for identifying assessment rules regarding availability of network resources, exploiting the assessment rules for determining availability of network resources, and providing available network resources from the first access gateway to the second access gateway according to the availability of network resources.

6 Claims, 8 Drawing Sheets

(51) Int. Cl.
  *H04W 48/16*   (2009.01)
  *H04W 88/16*   (2009.01)
  *H04L 47/125*  (2022.01)
  *H04W 92/12*   (2009.01)

(56) References Cited

U.S. PATENT DOCUMENTS

| | | | | |
|---|---|---|---|---|
| 2001/0054001 | A1* | 12/2001 | Robinson | G06Q 30/02 |
| | | | | 705/14.53 |
| 2010/0202391 | A1* | 8/2010 | Palanki | H04W 72/0426 |
| | | | | 370/329 |
| 2010/0254319 | A1* | 10/2010 | Karaoguz | H04W 16/04 |
| | | | | 370/329 |
| 2012/0329471 | A1* | 12/2012 | Barta | H04W 52/0206 |
| | | | | 455/452.1 |
| 2013/0035033 | A1 | 2/2013 | Sanneck et al. | |
| 2013/0279376 | A1* | 10/2013 | Ahmadi | H04W 16/14 |
| | | | | 370/277 |
| 2014/0161106 | A1* | 6/2014 | Park | H04W 28/0278 |
| | | | | 370/336 |
| 2015/0117328 | A1 | 4/2015 | Llairo et al. | |
| 2015/0131468 | A1* | 5/2015 | Navarro | H04W 24/02 |
| | | | | 370/252 |
| 2016/0270034 | A1* | 9/2016 | Chai | H04W 12/06 |
| 2016/0275411 | A1* | 9/2016 | Kim | G06F 16/24573 |
| 2017/0034832 | A1* | 2/2017 | Karimli | H04W 16/14 |
| 2017/0091028 | A1* | 3/2017 | Golan | G11C 29/028 |
| 2017/0208632 | A1* | 7/2017 | Gunasekara | H04L 12/141 |
| 2018/0164403 | A1* | 6/2018 | Inoue | G01S 5/22 |

* cited by examiner

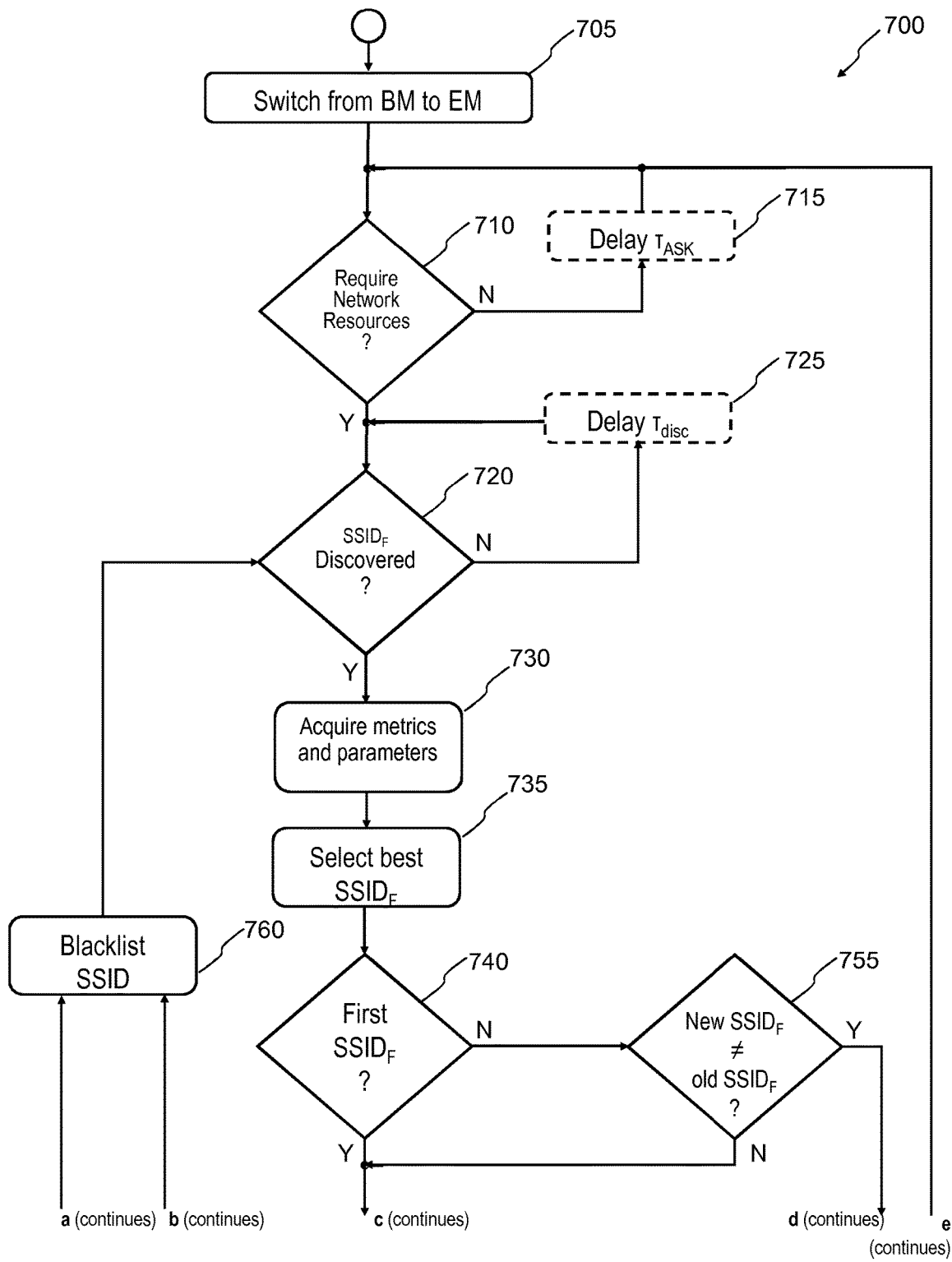

METHOD AND SYSTEM OF COOPERATION AMONG ACCESS GATEWAYS FOR BANDWIDTH SHARING

BACKGROUND OF THE INVENTION

Field of the Invention

The solution according to the present invention refers to communication networks. In detail, the solution according to the present invention relates to management of available network resources within a (data) communication network. In more detail, the solution according to the present invention relates to a method and a system of cooperation among access gateways for sharing network resources (e.g., bandwidth) thereof.

Overview of the Related Art

Internet Service Providers, or ISP, provide network connectivity to users, or subscribers, which subscribed with the ISP for receiving communication network services by connecting to a communication infrastructure deployed by the ISP.

Particularly, each subscriber selects one among a set of subscriptions plans provided by the ISP. The subscription plan selected by the subscriber determines an amount of network resources, such as for example a data throughput (e.g., a bandwidth), allocated by the ISP for providing the network connectivity of the subscriber.

The expression 'network connectivity' as used herein entails the capability to remotely access the Internet and/or one or more other computer networks (e.g., private, enterprise, etc., computer networks) through a user equipment (e.g., a laptop, a smartphone, a tablet, etc.).

Generally, a subscription plan may define a maximum throughput, i.e. maximum download bandwidth (e.g., 5, 7, 20, 100 Mbps or more) and a maximum upload bandwidth (e.g., 1, 5, 20 Mbps), which cannot be excessed by data transmission performed by the subscriber through the infrastructure of the ISP.

Moreover, the (physical) network infrastructure may pose physical limits to the network resources that the ISP may provide to subscribers (e.g., a maximum throughput of data transmission is defined the technology—ADSL, VDSL, Fiber, etc.—implemented).

Further, in case of a failure (either software or hardware), preventing or limiting the exchange data, in a portion of the network infrastructure where the subscriber is situated, the network connectivity is lost until the failure is solved.

In the art, some expedient have been proposed in order to mitigate the problems mentioned above.

For example, WO 2014/174343 discloses a service scheme for wireless networks, referred to as Semantic Service Set Identification (SeSSID). SeSSID makes it possible to provide a set of meta-functionality on top of current wireless technology. It does so by imposing a distinct meaning (hence the word semantic) to the service set identifier (SSID) of wireless 802.11 devices/access points. The SSID of 802.11 wireless networks is used in order to solve discovery, association, and/or authentication problems using direct and indirect service discovery with the aid of a SeSSID lookup server.

WO 2013/011088 discloses a method of providing communication between at least one wireless client device through a connectivity to a corresponding dedicated access point, as well as locating and recognizing a plurality of neighboring Access Points, and further comprising following actions: a) notifying said dedicated access point of a predetermined absence period to said at least one wireless client device it provides communication; b) during said predetermined absence period, said dedicated access point becoming a client to at least a second access point; c) receiving, said dedicated access point as a client, data corresponding to a backhaul bandwidth of said at least a second access point and aggregating said received backhaul data from said at least a second access point to its own backhaul data; and d) sending, said dedicated access point, said aggregated backhaul bandwidth data to said at least one wireless client device after the predetermined absence period has lapsed.

SUMMARY OF THE INVENTION

The Applicant has observed that, generally, the expedients known do not offer satisfactory solutions to the drawbacks outlined above.

The Applicant has therefore tackled the problem of how to provide in an automatic manner a sharing of network resources among networking devices, such as access gateways, in order to ensure and enhance network connectivity to devices served by such networking devices.

The Applicant has observed that providing a network entity capable of overseeing the operation of access gateways that provide network connectivity to user equipment of respective subscribers allows achieving an effective management of available network resources and an effective sharing of such network resources.

Accordingly, procedures for managing and sharing resources may be based on analysis of information regarding data traffic and network resources exploitation in the network infrastructure. Preferably, the analysis of such information may be exploited for identifying patterns in the data traffic and network resources exploitation, and also for identifying variations from such patterns.

In other words, the Applicant has found that implementing a procedure leading to an in-depth knowledge of the network infrastructure operation allows effectively controlling the sharing of network resources among access gateways, thus ensuring an efficient provision of network connectivity to the subscribers.

Particularly, one aspect of the present invention proposes a method of managing sharing of network resources between at least two access gateways. Each of the at least two access gateways is arranged for providing network connectivity to respective user equipment. The method comprises assessing whether at least one first access gateway is able to share at least a portion of respective available network resources; assessing whether at least one second access gateway requires additional network resources in addition to the respective available network resources in order to provide network connectivity to user equipment connected thereto, and establishing a wireless connection between the at least one first access gateway and the at least one second access gateway, the at least one first access gateway providing the at least a portion of respective available network resources as additional network resources for the at least one second access gateway. The method further comprises collecting information regarding an operation of the at least two access gateways; processing information for identifying assessment rules referred to availability of network resources, exploiting the assessment rules for determining the availability of network resources to be shared, and providing available network resources from the at least one first access gateway to the at least one second access gateway according to the availability of network resources determined by exploiting the assessment rules.

Preferred features of the present invention are set in the dependent claims.

In an embodiment of the present invention, processing information for identifying assessment rules referred to availability of network resources comprises processing information for identifying real-time rules, the real-time rules identifying deviations from the availability of network resources determined by exploiting the assessment rules; adjusting the availability of network resources to be shared based on the real-time rules Preferably, providing available network resources from the at least one first access gateway to the at least one second access gateway, comprises providing available network resources based on availability of network resources determined by exploiting the assessment rules adjusted by exploiting the real-time rules.

In an embodiment of the present invention, processing information for identifying assessment rules referred to availability of network resources comprises identifying usage patterns of the at least two access gateways, the usage patterns allowing defining an availability of network resources as a function of time. Preferably, the method further comprises processing, for each access gateway, the assessment rules for defining at least one access gateway metric. Even more preferably, determining at least one access gateway metric comprises processing, for each access gateway, the real-time rules together with the assessment rules for adjusting the at least one access gateway metric.

In an embodiment of the present invention, determining at least one access gateway metric comprises determining at least one among a speed metric accounting for data transfer speed of the access gateway; an availability metric accounting for the availability of the access gateway to share network resources as a function of time, and a ranking metric accounting for a quality of the network resources sharing provided by the access gateway.

In an embodiment of the present invention, the method further comprises selecting the first access gateway able to share at least a portion of respective available network resources with the second access gateway exploiting the at least one access gateway metric.

In an embodiment of the present invention, further comprises evaluating a signal quality of signal transmitted from the first access gateway to the second access gateway. Preferably, selecting the first access gateway able to share at least a portion of respective available network resources with the second access gateway further comprises exploiting the signal quality together with the at least one access gateway metric for selecting the first access gateway.

Another aspect of the present of the present invention proposes a method of managing a sharing of network resources between at least two access gateways each arranged for providing network connectivity to respective user equipment connected to a network infrastructure, the network infrastructure comprising an orchestrator network entity arranged for overseeing said sharing of network resources. The method comprises having the orchestrator network entity collecting information regarding an operation of the at least two access gateways, and processing information for identifying assessment rules referred to availability of network resources.

In an embodiment of the present invention, the method further comprises having the orchestrator network entity processing information for identifying real-time rules referred to availability of network resources. Preferably, the real-time rules allows determining deviations from the availability of network resources determined by exploiting the assessment rules.

In an embodiment of the present invention, processing information for identifying assessment information referred to availability of network resources comprises identifying usage patterns of the at least two access gateways, the usage patterns allowing defining an availability of network resources as a function of time. Preferably, the method further comprises having the orchestrator network entity determining, for each access gateway, at least one access gateway metric based on the assessment rules. Even more preferably, the method further comprises having the orchestrator network entity adjusting the at least one access gateway metric based on the real-time rules.

In an embodiment of the present invention, the method further comprises having the orchestrator network entity receiving an access gateway identifier univocally identifying the at least one first access gateway; decrypting the access gateway identifier in order to extract at least one further access gateway metric, comparing the further access gateway metric from the access gateway identifier with a corresponding access gateway metric determined by the orchestrator. Preferably, where a correspondence is detected during said comparison, store the access gateway identifier. Preferably, where a mismatch is detected during said comparison, requesting re-calculation of the access gateway identifier to the at least one fist access gateway univocally identified by the access gateway identifier.

In an embodiment of the present invention, further comprises having the orchestrator network entity receiving a request, from one access gateway, for the at least one access gateway metric associated with a corresponding access gateway identifier, and providing the at least one access gateway metric associated with a corresponding access gateway identifier to the requesting access gateway.

Another aspect of the present invention proposes an orchestrator network entity provided in a network infrastructure arranged for overseeing sharing of network resources between at least two access gateways, each arranged for providing network connectivity to respective user equipment, connected to the network infrastructure. The orchestrator network entity comprises an input/output interface for exchanging information with the at least two access gateways, and a data processing module for processing the information regarding the operation of the at least two access gateways. Preferably, the orchestrator network entity is configured for implementing the method of above.

In an embodiment of the present invention, the orchestrator further comprises at least a first repository for storing the information regarding the operation of the at least two access gateways, a second repository for storing any assessment rules and real-time rules determined by the data processing module, and a third repository for storing access gateway metrics determined by the data processing module.

Another aspect of the present invention proposes a method of managing a sharing of network resources between at least two access gateways, each connected to a network infrastructure and arranged for providing network connectivity to respective user equipment. The method comprising having a first access gateway assessing whether a portion of network resources are available for sharing with a second access gateway. Where portion of network resources are available for sharing, generating an access gateway identifier univocally identifying the at least one first access gateway; broadcasting the access gateway identifier; receiving a request for sharing network resources from the second access gateway, and providing the portion of network resources available for sharing to the second access gateway. Preferably, the access gateway identifier comprises data regarding the network resources available for sharing. Even more preferably, generating an access gateway identifier comprises having the at least one first access gateway comprises requesting to an orchestrator network entity provided in the network infrastructure information regarding the network resources available for sharing; receiving said information regarding the network resources available for sharing from the orchestrator network entity, and encoding said information regarding the network resources available for sharing in the access gateway identifier.

In an embodiment of the present invention, the information regarding the network resources available for sharing comprise at least one among a speed metric accounting for data transfer speed of the access gateway; an availability metric accounting for the availability of the access gateway to share network resources as a function of time, and a ranking metric accounting for a quality of the network resources sharing provided by the access gateway.

In an embodiment of the present invention, generating an access gateway identifier comprises having the at least one first access gateway encoding a portion of a medium access control—MAC—address of the first access gateway in the access gateway identifier.

In an embodiment of the present invention, generating an access gateway identifier comprises having the at least one first access gateway providing a predetermined prefix in the access gateway identifier, said predetermined prefix allowing identifying the first access gateway as capable of sharing network resources.

In an embodiment of the present invention, the access gateway identifier comprises a service set identifier.

In an embodiment of the present invention, the method further comprises having the at least one first access gateway receiving a request for generating a new access gateway identifier from the orchestrator network entity, and generating a new access gateway identifier univocally identifying the at least one first access gateway.

Another aspect of the present invention proposes a method of managing a sharing of network resources between at least two access gateways, each connected to a network infrastructure and arranged for providing network connectivity to respective user equipment. The method comprises having a first access gateway assessing whether additional network resources are required for providing network connectivity to respective user equipment. Where additional network resources are required, receiving at least one access gateway identifier univocally identifying a respective second access gateway capable of sharing a portion of network resources; acquiring data regarding the network resources available for sharing by the second access gateway; selecting the second access gateway as provider of the additional network resources based on the data regarding the network resources available for sharing thereof, and connecting to the second access gateway for receiving network resources available for sharing. Preferably, acquiring data regarding the network resources available for sharing by the second access gateway comprises one between decoding the data regarding the network resources available for sharing received from the access gateway identifier of the second access gateway, and requesting the data regarding the network resources available for sharing by the second access gateway to an orchestrator network entity provided in the network infrastructure and receiving said data regarding the network resources available for sharing by the second access gateway from the orchestrator network entity.

In an embodiment of the present invention, the information regarding the network resources available for sharing comprise at least one among a speed metric accounting for data transfer speed of the access gateway; an availability metric accounting for the availability of the access gateway to share network resources as a function of time, and a ranking metric accounting for a quality of the network resources sharing provided by the access gateway.

In an embodiment of the present invention, acquiring data regarding the network resources available for sharing by the second access gateway further comprises having the first access gateway measuring a signal quality associated with the access gateway identifier received.

In an embodiment of the present invention, receiving at least one access gateway identifier comprises receiving a plurality of access gateway identifiers. Preferably, selecting the second access gateway as provider of the additional network resources comprises building an ordered sequence of at least one among the speed metric, the availability metric, the ranking metric, and the signal quality associated with the plurality of access gateway identifiers, assigning a score to each access gateway identifier of the plurality of access gateway identifiers, and selecting as provider of the additional network resources the second access gateway associated with the access gateway identifier having the highest score.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

DETAILED DESCRIPTION OF THE INVENTION

Figure 1:
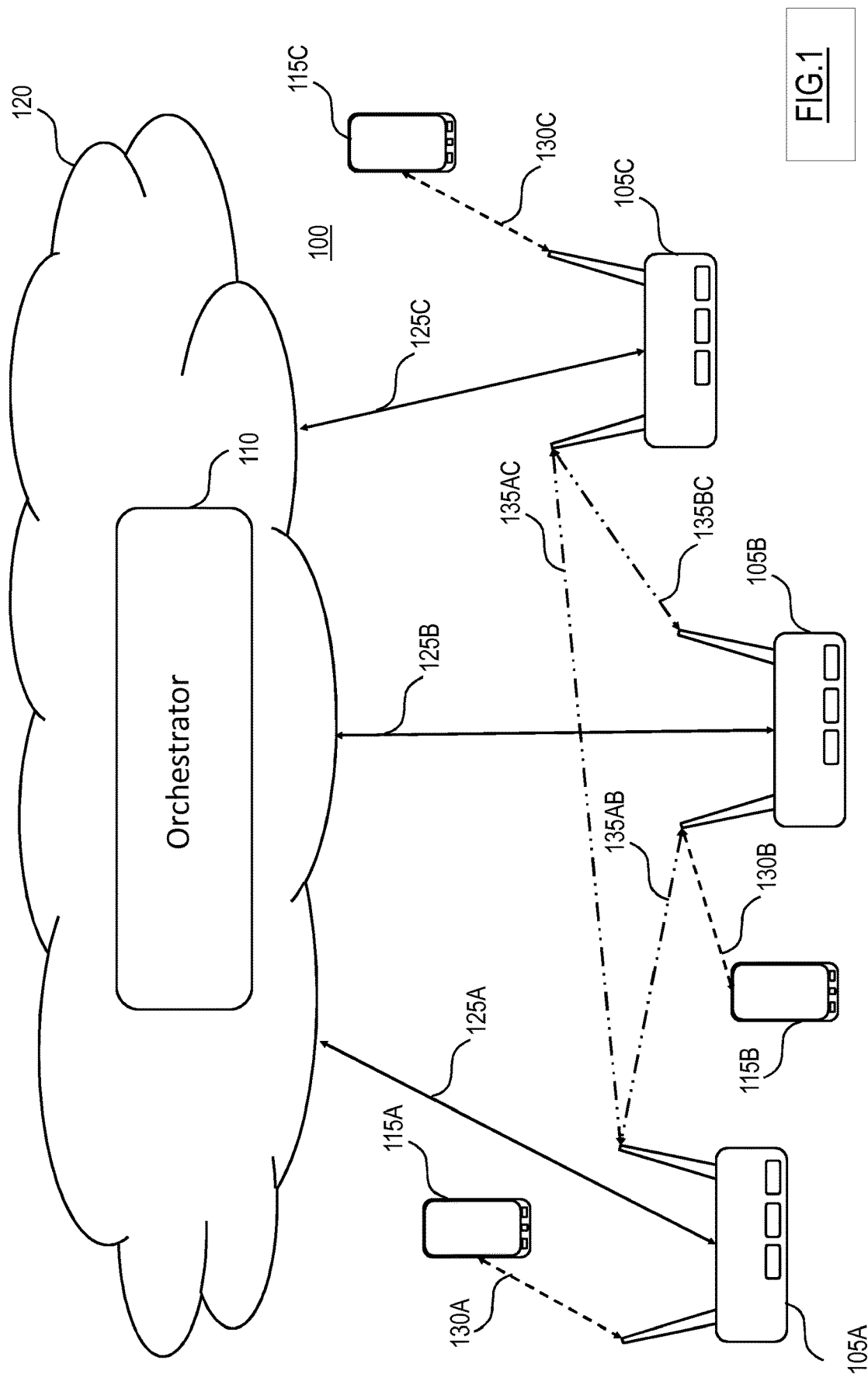
FIG. 1 is a schematic representation of a system according to an embodiment of the present invention.

With reference to the drawings, FIG. 1 is a schematic representation of a system 100 according to an embodiment of the present invention.

The system 100 comprises two or more Access Gateways, or AG 105 (modems, routers, etc.), such as the three AGs 105A, 105B and 105C in the example of FIG. 1, and an orchestrator network entity, or simply orchestrator 110, operatively coupled with the AGs 105A-C.

It should be apparent that the system 100 according to embodiments of the present invention may be comprised in a communication network provided by a network service provider, such as for example an Internet Service Provider, or ISP, for providing network connectivity (e.g., establishing and managing data exchange with one or more computer networks and/or the Internet) to a respective user, or subscriber (i.e. subscriber to services provided by the ISP).

Generally, each AG 105A to 105C is associated with a respective subscriber and is configured for providing network connectivity to one or more User Equipment (UE), or EU (e.g., personal computers, smartphones, tablets, IoT devices such as for example, connected cars, appliances, smart home devices, connected professional/industrial apparatuses, etc.), such as the EU 115A to 115C in the example of FIG. 1.

To this extent the AGs 105A-C are operatively connected (e.g., by means of fiber, coaxial cables, or even wirelessly) to a network infrastructure 120 of the ISP that routes and manages data exchange with the Internet and/or other restricted computing networks (e.g., corporate computing networks). The operative connection, which is denoted by solid lines 125A-C for AG 105A-C, respectively, in the example of FIG. 1, may be established through different media, based on network infrastructure 120 such as for example optic fiber (in FFTx technologies), electrically conductive wirings (e.g., telephone landline cables, in xDSL technologies) and/or electromagnetic radiations (e.g., by exploiting one or more wireless technologies, such as Long-Term Evolution, LTE, or Long-Term Evolution Advanced, LTE-A).

It should be noted that also mobile AGs (such as for example mobile broadband modems, mobile phones exploited in tethering mode, Pocket WiFi) may benefit from the solution according to embodiments of the present invention along with 'fixed' AGs (modems/routers connected to telephone landlines, optical fibers and/or electric distribution networks).

The AGs 105A-C are capable of providing wireless network connectivity to UE, such as the EU 115A-C, respectively. Preferably, the AGs 105A-C connect to, and exchange data with the UE, such as the EU 115, by means of one or more wireless technologies such as WiFi, Bluetooth, etc.—in the example of FIG. 1 wireless connections between AGs 105A-C and respective EU 115A-C are schematically indicated with dashed lines 130A-C, respectively.

It should be noted that the network connectivity provided by the ISP may be limited to a maximum speed of data exchange (e.g., in terms of bits per second [bps], such as for example download speeds of 7 Mbps, 10 Mbps, 20 Mbps, 100 Mbps, etc.) according to a subscription plan selected by the subscriber.

Generally, the maximum speed of data transmission may be different from (e.g., lower than) a physical maximum speed that may be reached by the AGs 105A to 105C and transmission media (e.g., data cables types and quality) according to the technology implemented (e.g. xDSL or FTTx).

The system 100 is configured for providing and managing a sharing of connection resources (e.g., available bandwidths for the transmission and receipt of data signals) among two or more Access Gateways, or AGs 105, such as the three AGs 105A, 105A and 105C for improving, and/or ensuring stability to, the connection resources exploited by the AGs 105A-C for the fruition of communication services (as described in the following).

In an embodiment of the invention, the AGs 105A-C are configured for operating in two main operating modes: a Basic Mode (BM) and an Extended Mode (EM).

In the basic mode, a generic AG 105A-C simply provides network connectivity to UE, such as the UE 115A, that establish a connection with the AG 105A-C, such as the AG 105A.

In the extended mode, the generic AG 105A-C may interact with one (or more) of the other neighboring AG(s) 105A-C.

Preferably, the generic AG 105A-C may interact with one (or more) neighboring AG(s) 105A-C in two ways. Namely, the generic AG 105A-C may interact in a forwarding extended mode (FWD) or in an asking extended mode (ASK). In the following, for sake of conciseness, the generic AG 105A-C operating in the forwarding extended mode is indicated as FWD AG 105A-C and, similarly, the generic AG 105A-C operating in the asking extended mode is indicated as ASK AG 105A-C.

In the example of FIG. 1, the connections among the AGs 105A-C that allow for network-resource sharing are schematically denoted by dash-dotted lines 135AB, 135AC and 135BC.

While operating in the forwarding extended mode, the generic AG 105A-C may provide part of its available network resources (e.g., available bandwidths for the transmission and receipt of data signals) to one (or more) of the other AGs 105A-C. in this case, the term 'available' in available network resources means a part of network resources not exploited for providing network connectivity to served UE by the generic AG 105A-C operating in the forwarding extended mode (as described in the following).

While operating in the asking extended mode, the generic AG 105A-C may request additional network resources to one (or more) of the other AGs 105A-C and, once assigned with such additional resources, may exploit the additional resources for providing network connectivity to the served UE by the generic AG 105A-C operating in the asking extended mode (as described in the following).

Generally, the generic AG 105A-C enters the asking extended mode, i.e. is an ASK AG 105A-C, for two main purposes.

A first purpose, also herein denoted to as (resources) extension purpose, is increasing the available network resources (e.g., bandwidth) for providing improved network connectivity to the UE 115A-C connected to the ASK AG 105A-C.

A second purpose, also herein denoted to as recovery (from failover) purpose, is ensuring network connectivity to a UE 115 connected to the ASK AG 105A-C in case that a failure (or failover) in the connection between the ASK AG 105A-C and the network or computing network 120 reduces or prevents accessing and/or exploiting the network resources normally available to the ASK AG 105A-C (e.g., according to the subscriber plan of the subscriber).

The orchestrator 110 is configured for overseeing the sharing of connection resources of the AGs 105A-C of the system 100 (as described in the following).

In an embodiment of the invention, the orchestrator 110 is implemented as a cloud computing entity. Cloud computing is herein intended to indicate computing based on distributed network computing. Generally, cloud computing dynamically exploits shared computer processing resources (hardware, firmware and/or software; e.g., computer terminals, servers, software applications, software services, virtual machines, etc.) and data storage resources, or data repositories (e.g., repositories, data centers, etc.), available in a computing network of the ISP or accessible by the ISP (e.g., operatively coupled to the network infrastructure 120).

In a different embodiment, the orchestrator 110 may be implemented in a single computing machine (e.g., a server) operatively connected to the network infrastructure 120 and configured to connect with the AGs 105A-C of the system 100.

Preferably, the orchestrator 110 may be implemented within a computing network comprised in, or connected to, the network infrastructure 120 managed by an Internet Service Provider, or ISP, which provides connection resources to the AGs 105A-C. For example, the orchestrator 110 may be implemented in a core network infrastructure of a telecommunication network managed by the ISP.

Generally, the orchestrator 110 is configured for collecting information regarding the operation of the AGs 105A-C, analyzing such (collected) information in order to generate data regarding the network resources available for sharing, preferably, metric data also indicated as Access Gateway, or AG, metrics—comprising data that allows, a FWD AG 105A-C, evaluating whether selecting or rejecting a request for network resources performed by an ASK AG 105A-C, and/or allows an ASK AG 105A-C evaluating whether selecting or rejecting a proposing FWD AG 105A-C (i.e., FWD AG 105A-C which is offering network resources)—, and finally the orchestrator 110 is configured for providing metric data to the AGs 105A-C.

Preferably, the information collected by the orchestrator 110 comprise, in a non-limiting manner:
information periodically provided by the AGs 105A-C regarding respective input/output (I/O) data (packets) traffic generated during the provision of network connectivity (e.g., amount of data in bytes exchanged, bandwidth usage, etc.);
information periodically provided by network infrastructure devices of the ISP, preferably by edge devices (e.g., one or more Digital Subscriber Line Access Multiplexer—DSLAM—known in the art and not herein described for the sake of brevity) of the network infrastructure 120;
explicit rules, such as for example default or actively set periods of time during which the AGs 105A-C are forbidden/prevented from sharing network resources (e.g., defined by the subscriber associated with the AG 105A-C), and
any further information (e.g., even provided by third parties) providing relevant context data (e.g., localization data and statistical data regarding UE 115A-C and AGs 105A-C, such as for example forecasts of positions as a function of time of UE 115A-C, which may be used for estimating the network resources usage based on a distance between UE 115A-C and AGs 105A-C, etc.). For example, further information may be collected from networking-capable devices—e.g., artifacts belonging to the so-called Internet of Things, or IoT, typology—, preferably connected to the AGs 105A-C, that may provide useful information regarding the availability of network resources (e.g., based on analysis of customized settings selected by the appliances owners and/or operating data exchanged through the network infrastructure 120).

Figure 2:
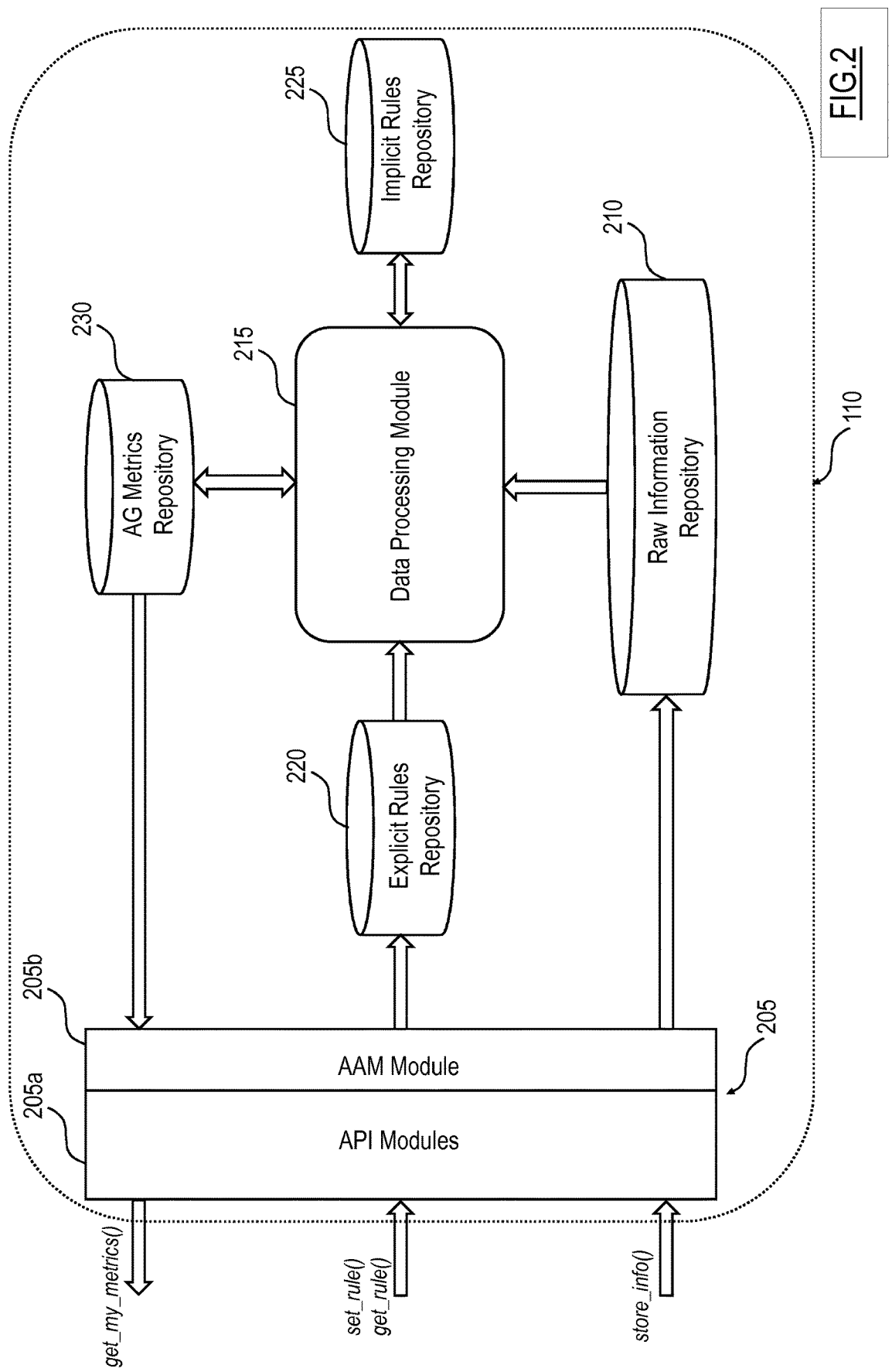
FIG. 2 is a schematic representation of an orchestrator according to an embodiment of the invention.

By making reference to FIG. 2, which is a schematic representation of the orchestrator 110 according to an embodiment of the invention, the general structure and operation of the orchestrator 110 are described in the following.

The orchestrator 110 comprises input/out (I/O) interface 205, arranged for exchanging data with the network infrastructure 120 and, particularly, with the AGs 105A-C implementing network resource sharing, a raw information repository 210, arranged for storing data received from entities (e.g., the AGs 105A-C) external to the orchestrator 110; a data processor module 215, arranged for 'mining' and processing data (as described in the following); an explicit rules repository 220, arranged for storing explicit rules defined from entities (e.g., the AGs 105A-C) external to the orchestrator 110; an implicit rules repository 225, arranged for storing implicit rules defined by the data processor module 215 based on data processing (as described in the following), and an Access Gateway, or AG, metrics repository 230, arranged for storing AG metrics generated by the data processor module 215 based on data processing (as described in the following).

In an embodiment of the invention, the I/O interface 205 comprises one or more Application Programming Interface, or API, modules 205a and an Authentication and Authorization Manager, or AAM, module 205b.

At least a part of the API modules 205a are configured for providing data exchange between the AGs 105A-C and the Orchestrator 110 of the system 100. Preferably, the API modules 205a are configured for exploiting one or more predetermined data structures, such as JSON—JavaScript Object Notation, an open-standard format that uses human-readable text to transmit data objects consisting of attribute—value pairs—for data exchange. Preferably, available information provided in different data structures other than the predetermined one may be ignored or stored and, possibly, subjected to further data processing in order to extract useful information.

According to an embodiment of the invention, the API modules 205a are configured for (but not limited to) implementing one or more of the following API (as known, an Application Programming Interface, or API, may comprise a set of subroutine definitions, protocols, and tools that allows communications between various software components).

A first API, indicated as 'store_info s_i' in the following, is designed for allowing an entity (e.g., the AGs 105A-C) external to the orchestrator 110, to store information within the orchestrator 110, preferably in the raw information repository 210. The information may be either raw information (e.g., data as generated during the operation of the AGs 105A-C) or pre-processed information (e.g., data processed by one or more elements of the network infrastructure 120).

For example, information may comprise a position indication (e.g., a set of geographic coordinates) of the UE 115 connected to one of the AGs 105A-C. Further information may comprise an indication of a usage of the available network resources of the AGs 105A-C (e.g., information may feature a string stating: "ADSL upload channel bandwidth is used at 95% from hours 20:00 to 20:30 on present day", or "connection failure/malfunction", etc.).

A second API, indicated as 'set_rule s_r' in the following, is designed for performing operations regarding the rules, preferably both implicit and explicit rules. For example, set_rule s_r allows performing an addition of new explicit rules, update existing explicit rules, delete existing explicit rules, activate/deactivate permanently or temporarily one or more selected explicit rules. In addition, set_rule s_r allows confirming/negating implicit rules (previously defined by the data processor module 215 as described in the following), permanent or temporary activation/deactivation of implicit rules.

A third API, indicated as 'get_rule g_r' in the following, is designed for obtaining information regarding (implicit and/or explicit) rules currently implemented in the system 100, and on which the current managing and coordinating of the sharing of network resources among the AGs 105A-C is based.

A fourth API, indicated as 'get_my_metrics g_m_m' in the following, is designed for allowing external entities, preferably the AGs 105A-C, requesting AG metrics (e.g., stored in the AG metrics repository 230) to the orchestrator 110.

A fifth API, indicated as 'get_metricSSID' g_mSSID in the following, is designed for allowing external entities, preferably the AGs 105A-C, requesting AG metrics associated with one or more Service Set Identifier, or SSID, of the system 100 (e.g., the AG metrics of the FWD AGs 105A-C identified by the SSID considered).

As known, SSID comprises 32 alphanumeric characters that serve as unique identifier attached to the header of data packets sent over a wireless local-area network (WLAN).

According to an embodiment of the invention, the Authentication and Authorization Manager, or AAM, module 205b manages the authentication and authorization of external entities (e.g., the AGs 105A-C) which connect to, or to which the orchestrator 110 tries to connect. To this extent the AAM module 205b may implement a predetermined authorization procedure, such as for example according to OAuth 2.0 (e.g., as defined in Internet Engineering Task Force, IETF, RFC 6749 October 2012) that is an open standard for authorization procedures that provides authorization and authentication without exposing passwords in order to ensure network security.

Advantageously, in order to effectively storing and managing a large quantity of, possibly heterogeneous, data (e.g., also denoted as Big Data in the jargon) received through the API store_info s_i the raw information repository 210 may comprise a Big Data managing element (not shown in the figures), for example the raw information repository 210 may implement an Apache Hadoop element. Apache Hadoop is an open-source software framework for distributed storage and distributed processing of very large data sets (known in the art and, thus, not further described herein).

The data processing module 215 is configured for retrieving the information stored in the raw information repository 210 and, preferably but not limitatively, explicit rules from the explicit rules repository 220 and/or implicit rules (already defined) from the implicit rules repository 225.

According to an embodiment of the invention, the data processing module 21 mines (useful) data from the information stored the raw information repository 210 and, possibly from the explicit and implicit rules repository 220 and 225, respectively, in order to define one or more implicit rules and/or other useful information (as described in the following).

Preferably, the data processing module 215 may mine through information by implementing data mining techniques known in the art, or proprietary data mining techniques (e.g., designed by the ISP or any other third party) in order to extract useful information for managing and coordinating the network resource sharing.

For example, the data processing module 215 may implement a k-means clustering technique for performing a clustering regarding the usage of network resources as a function of time for each AG 105A-C of the system 100. As known, k-means clustering is a procedure comprising vector quantization, originally used in signal processing, which is exploited for cluster analysis of information in data mining.

Regardless of the data mining technique implemented by the data processing module 215 a weight factor is preferably applied to the mined data.

In an embodiment of the invention, the weight applied to the mined data is based on time.

Preferably, the weight applied to each mined datum is based on a duration of a time interval separating the actual time instant (i.e., current time instant at which the system 100 provides and manages a sharing of connection resources) and a date at which the mined datum was recorded.

Even more preferably, the weight applied to the more recent data is greater than the weight applied to older data. In other words, information attained from more recent data are deemed more relevant than information attained from older data (since the former should reflect the current condition of network resources sharing in the system 100 in a more reliable manner that the latter).

For example, weights applied to mined data may be based on an exponential distribution.

At least a part of the results obtained from the data mining process, whether considered relevant and reliable, provide implicit rules associated with the AGs 105A-C and are saved in the implicit rules repository 225.

For example, relevancy and reliability of the data mining process and, accordingly, of the results thereof, may be evaluated based on the analysis of a recall capability of the data mining process on one or more historical sample. As known in the art, recall is a parameter computed as the fraction of relevant instances (i.e., useful data) effectively retrieved from a data set (e.g. the historical sample or the information stored in the raw information repository 210) with respect of the totality of relevant instances comprised in the data set considered.

Preferably, a data mining process and, accordingly, of the results thereof, may be considered reliable in case the recall resulting from the data mining on the historical sample(s) is equal to, or greater than, a predetermined recall threshold.

In a preferred embodiment according to the present invention, the implicit rules comprise assessment rules. Preferably, the data processing module 215 is configured for mining and analyzing data in order to allow the system 100 assessing (and possibly predicting) the availability of, and possibly the request for, network resources as a function of time. In other words, the data processing module 215 defines assessment rules regarding the availability of network resources within the system 100.

It should be noted that the data processing module 215 may generate assessment rules also by processing the explicit rules and by processing previously defined implicit rules in combination to or as an alternative to data mining as described above.

For example, the data processing module 215 is configured for implementing pattern recognition procedures during data mining. Even more preferably, although non-limitatively, pattern recognition procedures are implemented for identifying recurring (or periodic) schemes (or patterns) over time in the usage of network resources available to the AGs 105A-C. Accordingly, one or more of the implicit rules for the AGs 105A-C may be, preferably automatically, defined based on the recurring schemes identified by the pattern recognition procedures (thus allowing the orchestrator 110 to assess the availability of network resources during a predetermined period of time).

In a further embodiment, according to the present invention, the data processing module 215 may be further configured for implementing procedures aimed at inferring information for a different purpose other than defining assessment rules, e.g. comprising usage patterns of network resources, for a considered AG 105A-C.

Preferably, implicit rules further comprise real-time rules. The data processing module 215 may be configured for defining real-time rules regarding the availability of network resources. For example, real-time rules can be defined by applying data mining to most recent information obtained by the system 100. Such real-time rules may be used to provide confirmation to assessment on network resources availability and/or identifying deviations from assessed network resources availability based on the assessment rules.

For example, the data processing module 215 may infer whether the network resources managed by a considered AG 105A-C are effectively available for sharing, e.g. as assessed by implicit rules, based on (in a non-limiting manner) real-time rules mined from the analysis of real-time position data regarding habitual user thereof. This may be a case in which the data processing module 215 may verify if the network resources managed by a considered AG 105A-C are effectively available as defined by one or more corresponding implicit rules by defining one or more real-time rules based on (available) information on the positions (as a function of time) of one or more user equipment usually known to connect to the considered AG 105A-C. In detail, the data processing module 215 may define one or more real time rules confirming the one or more implicit rules when the mining of positions information reveals that the user equipment of the habitual user of the network resources of the considered AG 105A-C are currently out of a connection range thereof. Conversely, the data processing module 215 may define one or more real time rules contradicting the one or more implicit rules when the mining of positions information reveals that the user equipment of the habitual user of the network resources of the considered AG 105A-C are currently within a connection range thereof, or are suggesting a movement of the user equipment towards the considered AG 105A-C.

It should be noted that the examples above are only for illustrative purposes, and it should be apparent that the generation of real-time rules is not limited to data mining applied to positions information.

It should be further noted that time-based weights applied to mined data and real-time rules have different aims and implementations. In detail, by applying the time-based weight to mined data allows (preferably continuously) updating the implicit rules defined by the data processing module 215 according to the most recent behavioral/usage trends by the subscriber associated with the considered AG 105A-C. In other words, the higher relevance associated to most recent data obtained by exploiting time-based weights allows highlighting any variation over time in behavioral/usage trends by the subscriber associated with the considered AG 105A-C, which allows defining and/or updating implicit rules in a more effective and/or accurate manner. Conversely, real-time rules highlights substantially occasional and/or sudden variations in the current behavioral/usage by the subscriber associated with the considered AG 105A-C, which would lead to an erroneous assessment of available network resources.

The data processing module 215 of the system 100 if further configured for defining the one or more AG metrics for each AG 105A-C of the system 100. Preferably, each AG metric provides insight on operating parameters regarding the network connectivity provided by AG 105A-C of the system 100.

In other words, the AG metrics provide quantitative information regarding the network resources of the AG 105A-C that allows selecting an effective sharing of network resources (as described in the following).

In an embodiment of the invention, AG metrics expressed as a function of time are exploited to provide an indication of an evolution (over time) of respective one or more operating parameters regarding the network connectivity provided by AG 105A-C of the system 100 useful for evaluating the sharing of network resources.

According to a preferred embodiment of the invention, the AG metrics of a considered AG 105A-C are determined based on the implicit rules and based on the explicit rules referred to the AG 105A-C.

Preferably, the data processing module 215 is configured for retrieving implicit rules and explicit rules from the implicit rules repository 225 and from the explicit rules repository 220, and for exploiting such rules in order to provide AG metrics.

Even more preferably, the data processing module 215 may be configured for providing a higher relevance to explicit rules (i.e., in order to ensure that the system 100 operates according to requirements set by the subscribers) than implicit rules while defining the AG metrics.

The results are stored in the AG metrics repository 230, where they remain available for being exploited by implementing the API get_my_metrics g_m_m and/or get_metricSSID g_mSSID (as described in the following).

In an embodiment of the invention, at least one, preferably all, of the following (main) metrics are determined.

A first (main) metric is a speed metric S_m that accounts for upload and/or download line speeds (e.g., measured in bit per second [bps]). For example, the speed metric S_m may comprise hexadecimal format string expressing nominal upload and/or download line speeds measured in Mbps.

A second (main) metric is an availability metric A_m that accounts for the availability of the AG 105A-C of the system 100 to operate as a FWD AG during one or more predetermined time periods, or more generally as a function of time. Preferably, the availability metric A_m indicates a probability that one of the AG 105A-C of the system 100 is available to operate as a FWD AG during a considered time period.

In an embodiment of the invention, the availability metric A_m comprises a hexadecimal characters string (e.g., a string of two hexadecimal characters), which expresses the probability that the AG 105A-C is available for forwarding during the predetermined time period.

The availability metric A_m may be determined by the data processor 215 based on a statistical analysis of the operation of the AG 105A-C in a previous time period extending up to a current time instant. It should be noted that the analysis of the operation of the AG 105A-C may be based on the data stored in the raw information repository 210 and, preferably, the explicit rules repository 220 and/or the implicit rules repository 225.

For example, the availability metric A_m may be determined by simply implementing the k-means clustering technique in order to determine two clusters, i.e. a cluster of available AGs 105A-C and a cluster of non-available AGs 105A-C during discrete time interval (e.g., time intervals having a length of 15, 30, or 60 minutes; in other words, clusters have a granularity of 15, 30, or 60 minutes corresponding to the respective time interval length).

Nonetheless, different procedures may be implemented in order to determine the availability metric A_m without departing from the scope of the present invention.

Preferably, an (initial) default value for the availability metric A_m may be set in order to avoid errors during a cold-start of the system 100. Even more preferably, the default value may be selected according to a business logic (or domain logic, i.e. the part of the program that encodes business rules that determine how data can be created, stored, and changed within the system 100) implemented in the system 100. For example, a business logic implementing a 'conservative' approach may feature default value equal to about 20-30% of a predetermined time period; a business logic implementing an 'aggressive' approach may feature a default value equal to about 70-80% of the predetermined time period. Nevertheless, without specific business logic indications a default value of about 50% of the predetermined time period may be set.

A third (main) metric is a ranking metric R_m that accounts for a quality of the connection resources sharing in the following, provided by the AG 105A-C of the system 100 operating as a FWD AG.

In an embodiment of the invention, the rank metric R_m comprises a hexadecimal characters string (e.g., a string of two hexadecimal characters) expressing a quality value.

For example, the ranking metric R_m of each one of the AG 105A-C may be determined by a weighted average between a quality of electric signals exploited for transmitting data (e.g., expressed as Signal to Noise Ratio—SNR) and a ratio (e.g., a bandwidth ratio, BR for short) between borrowed network resources (as a FWD AG 105A-C, e.g., expressed as borrowed bandwidth) and asked network resources (i.e., from ASK AGs 105A-C; e.g., expressed as requested bandwidth).

Accordingly, by exploiting a SNR and a BR normalized in a range [0-100] and by exploiting weights w1 and w2 for SNR and a BR, respectively, the ranking metric R_m may be computed as:

$$R_m = \frac{w1 \times SNR + w2 \times BR}{w1 + w2}. \quad (1)$$

The weights w1 and w2, exploited in the definition of the ranking metric R_m, are preferably selected according to the business logic implemented in the system 100. For example, in a business logic implementing a 'conservative' approach the weights w1 and w2 are set in order to privilege the SNR over BR (e.g., w1=0.7 and w2=0.4). Conversely, in a business logic implementing a 'conservative' approach the weights w1 and w 2 are set in order to privilege the BR over SNR (e.g., w1=0.4 and w2=0.7)

Alternatively, the ranking metric R_m may be computed taking into account further dimensions, in addition or in alternative to the bandwidth ratio BR and the signal to noise ratio SNR, such as for example a stability of network resource sharing during the forwarding, stability St for short, and/or a level of security of communications exploiting the borrowed network resources, security Se for short.

In summary, the ranking metric R_m may be determined based on a plurality of N dimensions a (with i positive integer) each associated with a corresponding weight wr, as follows:

$$R_m = \frac{\sum_{i=1}^{N} w \times D_i}{\sum_{i=1}^{N} w_i}. \quad (2)$$

Preferably, an (initial) default value for the ranking metric R_m may be set in order to avoid errors during a cold-start of the system 100. Also in this case, the default value for the ranking metric R_m is selected according to the business logic implemented in the system 100 in a manner substantially similar to what described above with respect to the availability metric A_m.

Having described the general structure of the system 100 and of the orchestrator 110 according to an embodiment of the invention, the operation of the AG 105A-C of the system 100 as a FWD AG 105A-C is now described.

AG Operating in Forwarding Mode

Figure 3:
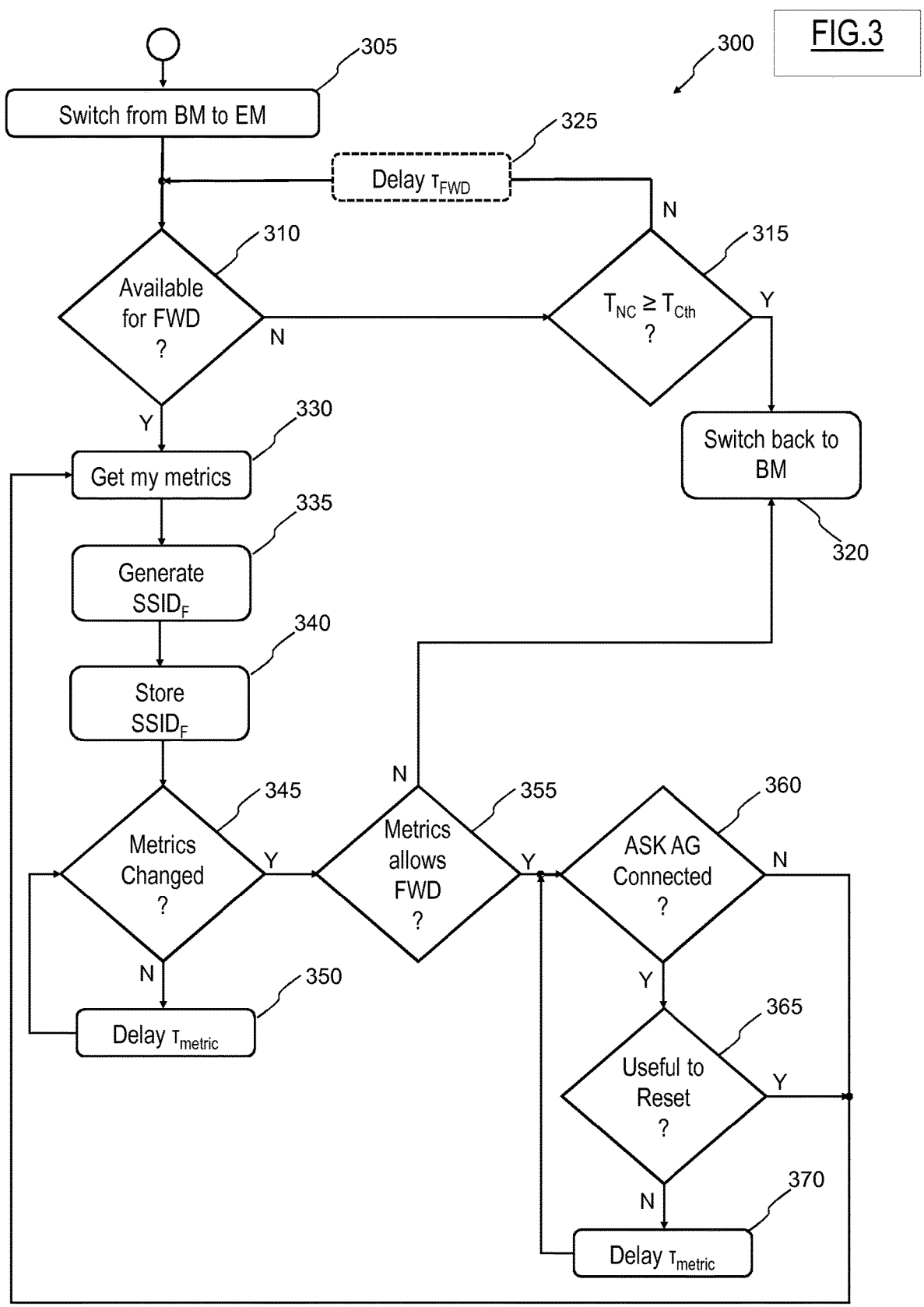
FIG. 3 is a schematic flowchart describing the operation of an access gateway operating as a forwarding access gateway according to an embodiment of the invention.

FIG. 3 is a schematic flowchart of principle describing the operation of a generic AG 105A-C of the system 100 operating as a FWD AG 105A-C.

Even though each one of the AG 105A-C of the system 100 may operate as a FWD AG 105A-C, for the sake of simplicity, in the following the operation in forwarding extended mode is referred to the AG 105A.

The (generic) AG 105A of the system 100 may switch (block 305) from the Basic Mode (BM) to the Extended Mode (EM). For example, the orchestrator 110, or the same AG 105A, may command a switch from BM to EM based on a current network resource usage by the AG 105A.

For example, the AG 105A is automatically switched from BM to EM by the ISP (generally, with the subscriber consent) and/or directly by the subscriber owning (or loaning from the ISP) the AG 105A.

Subsequently, the system 100 assesses (decision block 310) whether the AG 105A is available to operate as a FWD AG 105A.

In an embodiment of the invention, the availability to operate as a FWD AG 105A is verified whether the following FWD requirements are met for an availability time period TA equal to, or longer than, a (predetermined) availability threshold time period $T_{Ath}$ (e.g., 5 minutes):

the AG 105A is correctly providing network connectivity to User Equipment connected thereto, such as the UE 115A. In other words, it is checked whether a Wireless Area Network, WAN managed by the AG 105A is functioning properly;

a download traffic DT provided by the AG 105A to the UE 115A connected thereto is equal to, or lower than, a (predetermined) threshold download traffic $DT_{th}$ (e.g., $DT_{th}$ is set equal to 40% of a maximum download traffic allowed by the ISP).

an upload traffic UT provided by the AG 105A to the UE 115A, is equal to, or lower than, a (predetermined) threshold upload traffic $UT_{th}$ (e.g., $UT_{th}$ is set equal to 30% of a maximum download traffic allowed by the ISP).

an exploitation of hardware resources of the AG 105A is limited. For example, a CPU workload CW is equal to, or lower than, a (predetermined) threshold CPU workload $CW_{th}$ (e.g., CW is set equal to 40% of a maximum CPU workload), and an of (operating) memory (e.g., RAM) workload MW is equal to, or lower than, a (predetermined) threshold memory workload $MW_{th}$ (e.g., $MW_{th}$ is set equal to 60% of a maximum memory workload), and an overall traffic provided through WiFi connection(s) WFT of the AG 105A to the UE 115b, is equal to, or lower than, a (predetermined) threshold WiFi traffic $WFT_{th}$ (e.g., $WFT_{th}$ is set equal to 60% of a maximum WiFi traffic allowed by the AG 105A-C technology).

In the negative case (exit branch N of decision block 310), i.e. the requirements are not met by the AG 105A, the AG 105A remains in the Extended Mode and it is checked (decision block 315) whether the AG 105A has been deemed non-compliant with the FWD requirements for entering the Forwarding Extended Mode FWD for a non-compliancy time period $T_{NC}$ equal to, or greater than, a compliance time threshold $T_{Cth}$.

In the affirmative case (exit branch Y of decision block 315), the time period is equal to, or greater than, the compliance time threshold $T_{Cth}$, the AG 105A is switched back to the Basic Mode (block 320).

In the negative case (exit branch N of decision block 315), the time period is lower than the compliance time threshold $T_{Cth}$, operation returns to decision block 310 for assessing anew the compliance with the FWD requirements. Possibly, a (first) FWD delay time period $T_{FWD}$ is waited (dashed block 325) before reiterating the check for compliance with FWD requirements.

Back to decision block 310, in the affirmative case (exit branch Y of decision block 310), i.e. the AG 105A complies with the FWD requirements, the AG 105A may be set in the forwarding extended mode, i.e. it may become a FWD AG 105A.

Accordingly, the AG 105A, through the API get my metrics g_m_m, requests (330) to the orchestrator 110 updated metrics, stored in the AG metrics repository 230.

A (dedicated) forwarding Service Set Identifier $SSID_F$ is generated (block 335) in order to allow effectively sharing network resources with one or more ASK AGs 105A or 105C (as described in the following).

Figure 4:
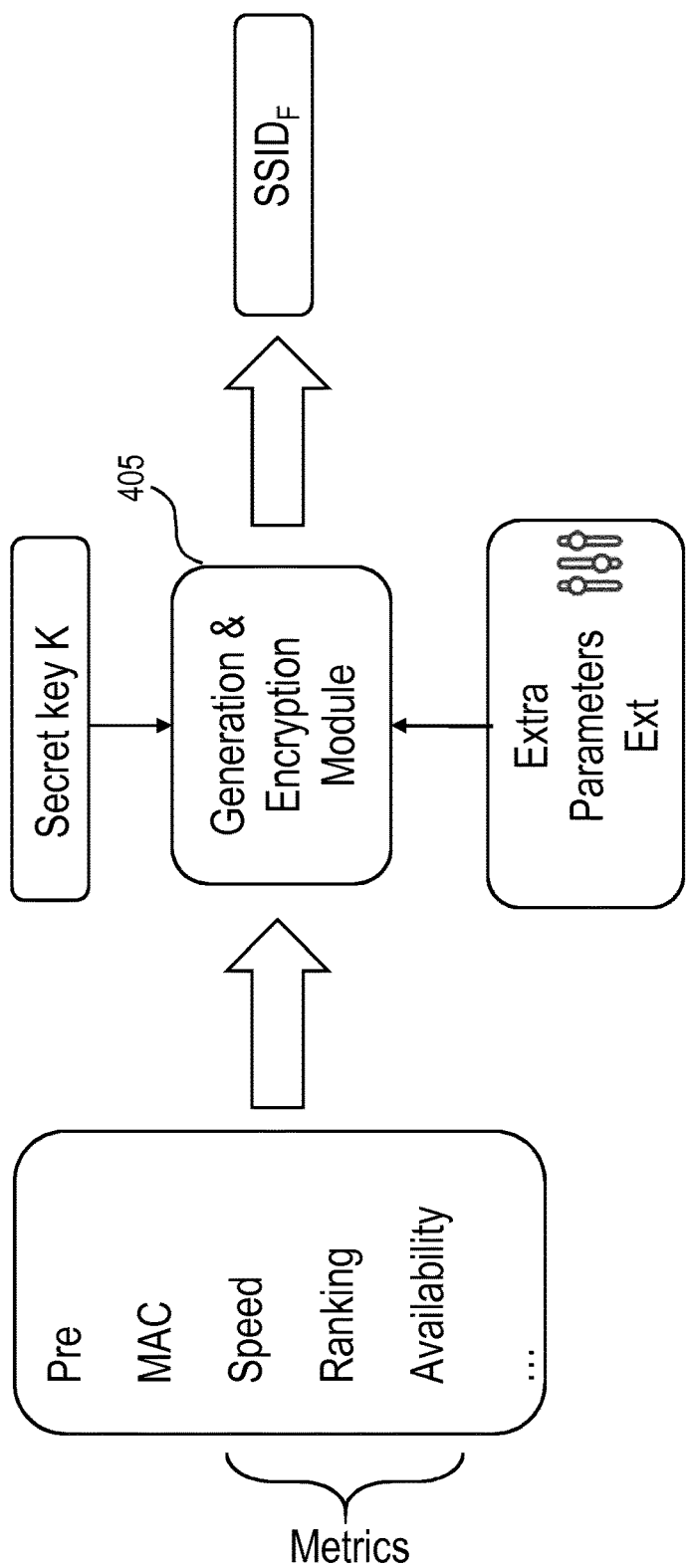
FIG. 4 is a schematic representation of a generation process of a generic forwarding Service Set IDentifier according to an embodiment of the present invention.

The $SSID_F$ may be generated as described in the following, by making reference to FIG. 4, which is a schematic representation of a generation process of a generic forwarding SSID $SSID_F$ according to an embodiment of the present invention.

Preferably, the generation of the forwarding SSID $SSID_F$ is performed by a generation and encryption module 405 based on the following inputs:

one or more of the metrics values obtained by the orchestrator 110, i.e. at least one among the speed metric S_m, the availability metric A_m, and the ranking metric R_m mentioned above;

a MAC (Medium Access Control) address MAC of the AG 105A-C, and a (predetermined) prefix Pre. Preferably, the prefix Pre comprises a string exploited by the ISP for marking the forwarding SSID $SSID_F$ in order to simplify an identification of the FWD AG 105A (as described in the following).

It should be noted that the above list is not to be construed as exhaustive of factors considered for generating the forwarding SSID $SSID_F$.

The generation and encryption module 405 combines the inputs of above with a secret key K (or with a public key if an asymmetric encryption is implemented) in order to generate the forwarding SSID $SSID_F$. Possibly, generation and encryption module 405 may be configured for combining also one or more extra parameter Ext together with the inputs and the secret key K in order to generate the forwarding SSID $SSID_F$.

In an embodiment of the invention, a first extra parameter Ext1 and a second extra parameter Ext2 may be defined. For example, the first extra parameter Ext1 comprises a single hexadecimal character exploited for proprietary uses, such as a reliability of the availability metric A_m (e.g., E1=0: unknown reliability, E1=1: minimum reliability, . . . , E1=F: maximum reliability). Similarly, the second extra parameter Ext2 comprises a single hexadecimal character exploited for proprietary or future purposes, such as for indicating a connection technology (e.g., E2=0: unknown connection technology, E2=1: ADSL, E2=2: ADSL2+, E2=3: VDSL, E2=4: VHDSL, E2=5: FTTCab, E2=6: FTTH, . . . ).

Figure 5:
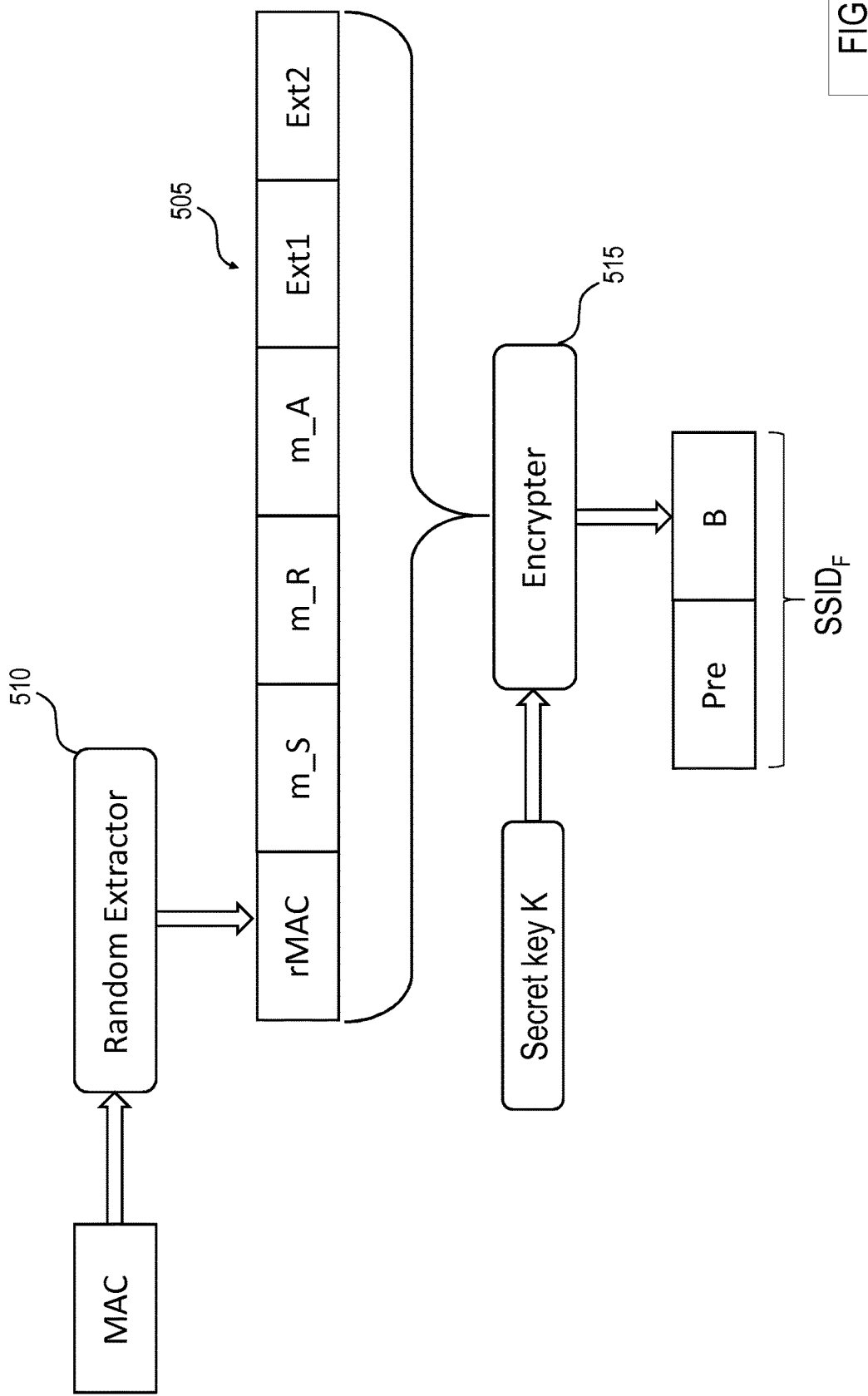
FIG. 5 is a more detailed a schematic representation of a generation process of a generic forwarding SSID according to an embodiment of the present invention.

By making reference to FIG. 5, which is a more detailed a schematic representation of a generation process of a generic forwarding SSID $SSID_F$ according to an embodiment of the present invention, the generation of the (encrypted) forwarding SSID $SSID_F$ is herein described in greater detail.

The MAC address MAC, the metrics S_m, A_m and R_m, and, possibly, one or more extra parameters, such as two extra parameters Ext1 and Ext2 shown in the example of FIG. 5, are combined in a string 505.

Preferably, only a subset rM of the figures of the MAC address MAC is combined in the string 505. Even more preferably, the generation and encryption module 405 implements a random extractor 510 configured for randomly select a set of random figures out from the (hexadecimal) figures comprised in the MAC address MAC is combined in the string 505.

This allows reducing an overall length of the string 505, while avoiding (or at least reducing a likelihood) of collision among forwarding SSID $SSID_F$ associated with different FWD AGs 105A-C.

Indeed, assuming that the random extractor 510 is configured for randomly selecting a set of figures comprised in the MAC address MAC comprising n characters, a collision probability $P_{col}$ between two forwarding SSIDs $SSID_F$ corresponds to the probability that the random extractor 510 randomly selects the same n characters in the same order for two different MAC addresses MAC, or:

$$P_{col} \leq \left(\frac{1}{16}\right)^n, \qquad (3)$$

wherein the number sixteen (16) accounts for the sixteen possible hexadecimal character values that a character comprised in the MAC address MAC may have. For example, in case the set of randomly selected characters is set to six (i.e., n=6) the collision probability $P_{col}$ results equal to, or lower than, $5.96 \times 10^{-8}$ which substantially ensures collisions avoidance among forwarding SSID $SSID_F$.

In summary, the generation and encryption module 405 generates a string 505 composed by the randomly selected the subset rM of figures of the MAC address MAC, the metrics S_m, A_m and R_m, and the extra parameters Ext1 and Ext2.

The generation and encryption module 405 implements an encrypter 515 configured for receiving the string 505 and encrypting the string 505 based on the secret key K.

For example, the encrypter 515 comprises a XOR function which is applied to the string 505 for yielding an output string that is a 'body' string B of the forwarding SSID $SSID_F$. Preferably, the XOR function is a Hex-XOR, i.e. is designed for outputting the body string B in hexadecimal format (an example of Hex-XOR function that may be implemented by the encrypter 515 is the PHP function bin2hex).

Finally, the forwarding SSID $SSID_F$ is completed by the generation and encryption module 405 by concatenating the body string B to the prefix pre.

Preferably, a total length of the forwarding SSID $SSID_F$ is comprised within thirty-two (length≤32) figures according to IEEE 802.11 specifications.

Back to the flowchart of FIG. 3, after the generation of the forwarding SSID $SSID_F$ at block 335 the AG 105A effectively operates as FWD AG 105A, i.e. it is ready to provide network resources to ASK AGs 105B and/or 105C in (wireless) connection range that require extra network connectivity (as described in the following).

The FWD AG 105A thus provides (block 340) the forwarding SSID $SSID_F$ just generated to the orchestrator 110 by means of the API store_info s_i (described above), and wirelessly broadcast the forwarding SSID $SSID_F$ in order to allow AGs 105B and 105C (within transmission range) recognizing the FWD AG 105A. It should be noted that a message in any format used by the FWD AG 105A and, interpretable by the orchestrator 110, may be used for providing the forwarding SSID $SSID_F$ to the orchestrator 110.

In an embodiment of the invention, the forwarding SSID $SSID_F$ may be provided to the orchestrator 110 by means of a JSON format message, such as for example:

```
{
"action": "ag::store::fwd::ssid",
"ssid": "TEB3435303235343330353130393",
"line_id":""
}
```

Wherein "action" invokes the API store_info s_i for storing the forwarding SSID $SSID_F$, "ssid" contains the forwarding SSID $SSID_F$, and "line_id" is a (optional) field indicating univocal line identifier associated with the forwarding SSID $SSID_F$; for example, the "line_id" may be automatically attainable from the network infrastructure 120 or may be explicitly provided by the FWD AG 105A (preferably, "line_id" is automatically obtained from the network infrastructure 120 for security reason, e.g. by using a network primitive "ip2cli"—a primitive is a basic interface or segment of software program code that can be implemented and or used to build more sophisticated software program elements or interfaces).

Once the forwarding SSID $SSID_F$ has been stored in the Orchestrator 110, the network resources shared by the FWD AG 105A are effectively available for being provided to one or more ASK AGs 105A-C of the system 100 which asks for such network resources (as described in the following).

After the generation of the forwarding SSID $SSID_F$ at block 335 the AG 105A provides the forwarding SSID $SSID_F$ to the orchestrator 110 where it is decrypted and stored (block 340).

Figure 6:
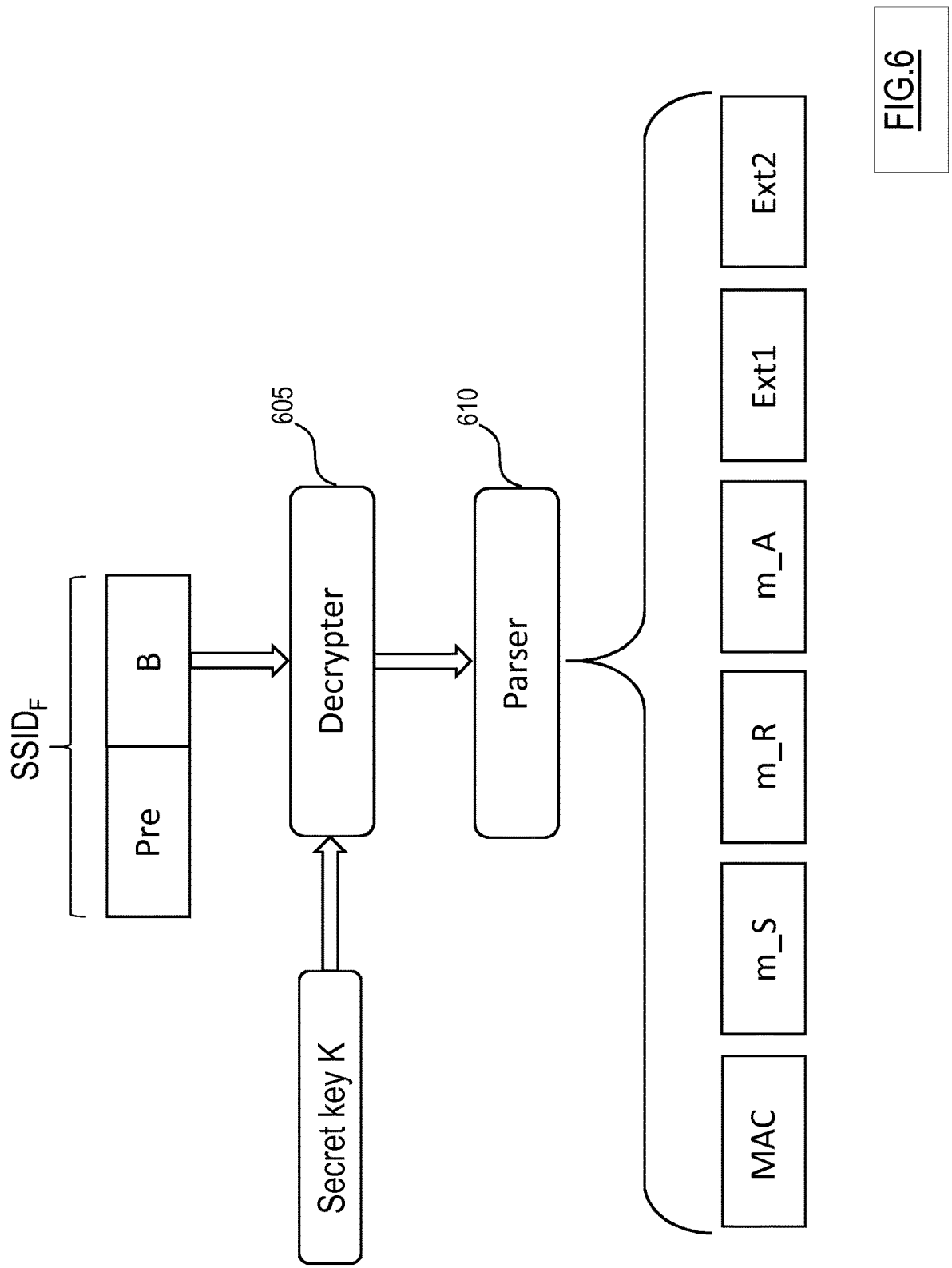
FIG. 6 is a schematic representation of a decryption procedure applied to a generic forwarding SSID received by the orchestrator.

According to an embodiment of the present invention, a decryption procedure is applied to a generic forwarding SSID $SSID_F$ received by the orchestrator 110, which is herein described by making reference to FIG. 6.

Preferably, for each generic forwarding SSID $SSID_F$ received by the orchestrator 110, the following information are stored (e.g., in the raw information repository 210) by implementing the primitive store_info s_i:

a timestamp: a time indication at which the forwarding SSID $SSID_F$ is received at the orchestrator 110 (e.g.: comprising date, time information preferably expressed as a Coordinated Universal Time—CUT);

the line_id: a univocal line identifier, such information may be, preferably, automatically obtained from the ISP communication network (e.g., by means of the primitive "ip2clf") or may be provided explicitly by the FWD AG 105A-C (e.g., within the JSON format message of the above example), and the forwarding SSID $SSID_F$.

Preferably, at the orchestrator 110 a decryption procedure is implemented on the forwarding SSID $SSID_F$ in order to extract the information therein contained.

Initially, the body string B is extracted from the forwarding SSID $SSID_F$, which is then decrypted by a decrypter 605 configured for receiving the body string B and decrypting the information comprised therein based on the secret key K (or with a private key if an asymmetric encryption is implemented).

In an embodiment of the invention, the decrypter 605 comprises a XOR function which is applied to the body string B for yielding an output string that corresponds to an unencrypted version of the body string B of the forwarding SSID $SSID_F$. Preferably, the XOR function is a Bin-XOR, i.e. is designed for outputting unencrypted body string B.

For example, the Bin-XOR function implemented by the decrypter 605 may be defined as (expressed as a pseudocode based on PHP programming language):

$decrypted=xor_this(pack('H*', $FWD_SSID), SECRET_KEY), where xor this( ) implements a XOR operation between the two arguments between the parenthesis, the PHP pack( ) function packs the argument, i.e. $FWD_SSID—the body string B of the forwarding SSID $SSID_F$ in the example above, into a binary string from the original format, i.e. indicated by H*—Hex string in the example, and SECRET_KEY is the secret key K.

The unencrypted body string B is then processed by a parser 610 configured for separating the information comprised in the body string B, i.e.: the randomly selected set rM of figures of the MAC address MAC, the metrics S_m, A_m and R_m, and the one or more extra parameters, such as two extra parameters Ext1 and Ext2.

In an embodiment of the invention, the values of the metrics S_m, A_m and R_m comprised in the unencrypted body string B of the forwarding SSID $SSID_F$ are compared with the values of the metrics S_m, A_m and R_m stored within the AG metrics repository 230 (which substantially correspond to effective current values).

In case the values of the metrics S_m, A_m and R_m comprised in the unencrypted body string B corresponds to the values of the metrics S_m, A_m and R_m stored within the AG metrics repository 230, the forwarding SSID $SSID_F$ is accepted by the orchestrator 110 and stored in the AG metrics repository 230.

Conversely, in case the values of the metrics S_m, A_m and R_m comprised in the unencrypted body string B do not correspond to the values of the metrics S_m, A_m and R_m stored within the AG metrics repository 230, network resources usage and/or availability of the FWD AG 105A have changed since the generation of the forwarding SSID $SSID_F$ and, therefore, the forwarding SSID $SSID_F$ has to be recalculated.

In an embodiment of the invention, the system 100 may be designed for enhancing a convergence of the comparison between metrics S_m, A_m and R_m values as described above.

For example, the orchestrator 110 may be configured for keep track of mismatches between the values of the metrics S_m, A_m and R_m comprised in the unencrypted body string B and the values of the metrics S_m, A_m and R_m stored within the AG metrics repository 230 and halt an update of the values of the metrics S_m, A_m and R_m in the AG metrics repository 230 until a corresponding successive forwarding SSID $SSID_F$ is sent by the FWD AG 105A and is received at the orchestrator 110.

Alternatively or in addition, a time interval separating two different update of the values of the metrics S_m, A_m and R_m in the AG metrics repository 230 may be set to a minimum update time interval value that allows receiving from a FWD AG 105A a corresponding forwarding SSID $SSID_F$ within such time interval.

Back to the flowchart of FIG. 3, after the provision of the forwarding SSID $SSID_F$ to the orchestrator 110 (at block 340) AG 105A effectively operates as FWD AG 105A, i.e. it is ready to provide network resources to ASK AGs in (wireless) connection range that require extra network connectivity (as described in the following).

Preferably, the FWD AG 105A periodically checks (decision block 345) whether the values of the metrics S_m, A_m and R_m have changed with respect to the values encrypted in the forwarding SSID $SSID_F$ and stored in the AG metrics repository 230 of the orchestrator 110.

In the negative case (exit branch N of decision block 345), i.e. the values of the metrics S_m, A_m and R_m have not changed with respect to the values encrypted in the forwarding SSID SSID, the check at block 345 is re-iterated after waiting (block 350) a predetermined (second) metric delay time period $T_{metric}$.

In the affirmative case (exit branch Y of decision block 345), i.e. the values of the metrics S_m, A_m and R_m have changed with respect to the values encrypted in the forwarding SSID $SSID_F$, it is further checked (decision block 355) whether the current values of the metrics S_m, A_m and R_m allow an effective network resource sharing. For example, if one or more of the current values of the metrics S_m, A_m and R_m results equal to zero, the FWD AG 105A-C is deemed as no longer able to operate in forwarding mode.

In the negative case (exit branch N of decision block 355), i.e. the current values of the metrics S_m, A_m and R_m do not allow an effective network resource sharing, the FWD AG 105A exits the forwarding extended mode returning at the Basic Mode of operation at block 320 (e.g., until the ISP or the subscriber reset the AG 105A to the Extended Mode and/or until a predetermined time period has expired).

In the affirmative case (exit branch Y of decision block 355), i.e. the current values of the metrics S_m, A_m and R_m allow an effective network resource sharing, it is further checked (decision block 360) whether the FWD AG 105A is providing network resources to one or more ASK AGs 105B or 105C.

In the negative case (exit branch N of decision block 360), i.e. the network resources of the FWD AG 105A are not shared with any ASK AGs 105B or 150C, the procedure entails a reset of the forwarding SSID $SSID_F$ by returning through block 330 at block 335 for generating the new forwarding SSID $SSID_F$ based on the current metrics S_m, A_m and R_m.

In the affirmative case (exit branch Y of decision block 60), i.e. the network resources of the FWD AG 105A are shared with one or more ASK AGs 105B or 50C, it is further checked (decision block 365) whether it is advantageous to reset forwarding SSID $SSID_F$, even though this entails interrupting any currently active sharing of network resources with the one or more ASK AGs 105B or 150C.

Preferably, although not necessarily, the criterion for assessing a convenience in resetting a forwarding SSID $SSID_F$ (i.e., generating a new forwarding SSID $SSID_F$) is based on a divergence between one or more values of the metrics S_m, A_m and R_m comprised in the forwarding SSID $SSID_F$ and the current values of the metrics S_m, A_m and R_m (evaluated by the FWD AGs 105A). For example, in case a value of the availability metric A_m comprised in the forwarding SSID $SSID_F$ stated an availability of two (2) hours, while in a following check the current value of the availability metric A_m dropped to ten (10) minutes, a reset of the forwarding SSID $SSID_F$ (i.e., generating a new forwarding SSID $SSID_F$) may be considered a convenient in order to avoid that one or more other ASK AGs 105B or 150C establish a connection with the FWD AG 105A for receiving shared network resources for such a short amount of time. Particular, the reset of the forwarding SSID $SSID_F$ could be considered advantageous since network resources provided by the FWD AG 105A are briefly (i.e., within 10 mins in the example at issue) going to be zeroed also for the one or more ASK AGs 105B or 150C already availing themselves with such network resources offered by the FWD AG 105A.

In the affirmative case (exit branch Y if decision block 365), i.e. it is advantageous to reset the forwarding SSID $SSID_F$, the procedure entails a reset of the forwarding SSID $SSID_F$ by returning through block 330 at block 335 for generating the new forwarding SSID $SSID_F$ based on the current metrics S_m, A_m and R_m.

In the negative case (exit branch N of decision block 365), i.e. it is not advantageous to reset the forwarding SSID $SSID_F$, the check at block 360 is re-iterated after waiting (block 370) a predetermined (third) reset delay time period $T_{reset}$.

AG Operating in Asking Mode

Figure 7B:
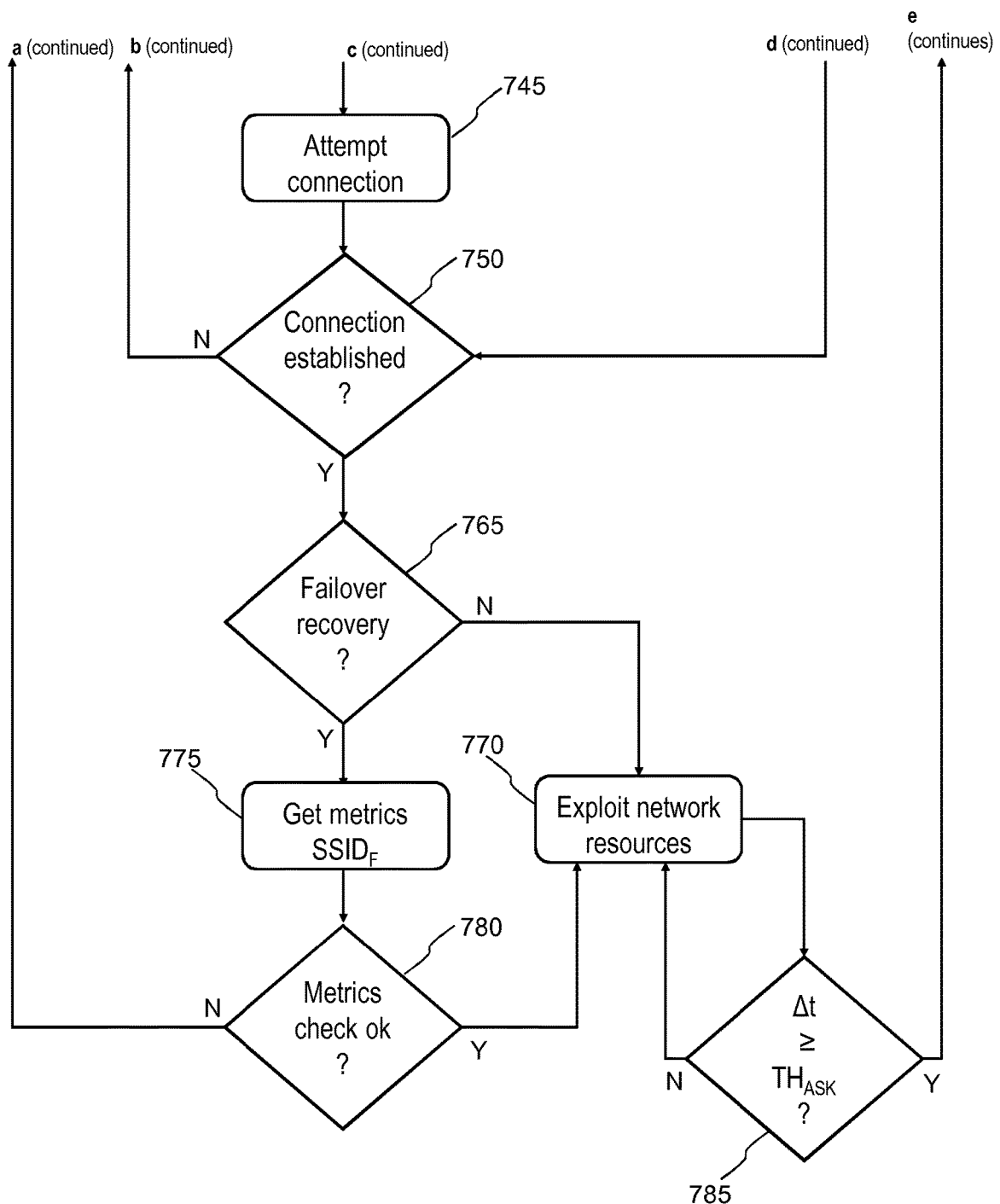
FIG. 7 is a schematic flowchart of principle describing the operation of a generic access gateway operating as an asking access gateway.

FIGS. 7A and 7B is a schematic flowchart of principle describing the operation of a generic AG 105A-C of the system 100 operating as an ASK AG 105A-C.

Even though each one of the AG 105A-C of the system 100 may operate as an ASK AG 105A-C, for the sake of simplicity, in the following the operation in asking extended mode is referred to the AG 105B The AG 105B of the system 100 may switch (block 705) from the Basic Mode to the Extended Mode under the control of the ISP or the subscriber as described above.

Subsequently, it is assessed (decision block 710) whether the AG 105B requires extra network resources for managing its current workload (i.e., data traffic through the AG 105B).

As mentioned above, two main purposes may lead the AG 105B to enter the asking extended mode: (resources) extension (i.e., increasing available network resources for addressing increased workload) and failover (i.e., ensuring network connectivity even in case of failure in a direct connection between the AG 105B and the network infrastructure 120).

In an embodiment of the invention, detecting the occurrence of the following (non-limiting) conditions for a period of time equal to, or greater than, an asking threshold time period $T_{ask}$ (e.g., $T_{ask} \geq 5$ minutes) triggers the switch to the asking extended mode in case of extension purpose.

A first extension condition entails that the data exchanged managed by the AG 105B (e.g., in order to provide network connectivity to the UE 115B) cannot be effectively managed by network resources available to the AG 105B. For example, download data traffic is detected to be equal to, or above, a predetermined download threshold value $TH_{down}$ (e.g., $TH_{down} \geq 60\%$ of a total available download bandwidth) and/or upload data traffic is detected to be equal to, or above, a predetermined upload threshold value $TH_{up}$ (e.g., $TH_{up} \geq 60\%$ of a total available upload bandwidth).

A second extension condition entails assessing whether an amount of data exchanged over a wireless interface (e.g., a WiFi interface) of the AG 105B is suitable for operating in the asking extended mode. Preferably, the second condition is favorable to switch to the asking extended mode if the data traffic exchanged over the wireless interface of the AG 105B is equal to, or lower than, a predetermined wireless data threshold $TH_{wd}$ (e.g., $TH_{wd} \leq 60\%$ of a total data traffic manageable by the wireless interface of the AG 105B).

In an embodiment of the invention, detecting the occurrence of the following condition for a period of time equal to, or greater than, the asking threshold time period $T_{ask}$ (e.g., $T_{ask} \geq 5$ minutes) triggers the switch to the asking extended mode in case of recovery purpose.

A recovery condition comprises a failure in the connection between the AG 105B and the network infrastructure 120 that prevents, or substantially limits (i.e., reduces the data exchange below a minimum threshold level), any data exchange between the AG 105B and the network infrastructure 120.

Thus, in the negative case (exit branch N of decision block 710), i.e. extra network resources are not required for managing the current workload, operation returns (loops back) to decision block 710 for assessing anew the compliance with ASK conditions. Preferably, a (fourth) ASK delay time period $T_{ASK}$ is waited (dashed block 715) before re-assessing of conditions for switching to the asking extended mode.

In the affirmative case (exit branch Y of decision block 710), i.e. extra network resources are required for managing the current workload, a SSID discovery procedure is performed (decision block 720).

In an embodiment of the invention, the SSID discovery procedure comprises that the considered AG 105B scans for AGs 105A or 150C capable of wireless communication in range. Preferably, SSID discovery procedure further comprises identifying and storing (e.g., in a memory element of the considered AG 105A or 150C) only $SSID_S$ comprising the prefix Pre, i.e. forwarding $SSID_S$ $SSID_F$ associated with corresponding FWD AGs 105A-C.

In an embodiment of the invention, the AGs 105A-C comprise a memory element (e.g., a cache element) which is configured for storing the any forwarding SSID $SSID_F$ received together with an associated signal quality Q measured by the AGs 105A-C and, preferably, the information extracted from the forwarding SSID $SSID_F$. Such information are used for selecting the preferred FWD AG 105A and/or 150C.

Accordingly, information comprised in the memory element are stored and/or updated in order to reflect the current condition of the system 100. For example, the generic AG 105B:

adds to the information comprised in the memory element a forwarding SSID $SSID_F$ received at the AG 105B if it has a MAC address MAC not previously comprised among the information of the memory element;

updates the information regarding a forwarding SSID $SSID_F$ received at the AG 105B if it has a MAC address MAC previously comprised among the information of the memory element, but the associated metrics S_m, A_m and R_m have changed;

delete the information regarding a forwarding SSID $SSID_F$ comprised among the information of the memory element, whether such forwarding SSID $SSID_F$ is not received at the AG 105B within a predetermined aging time period.

In case the discovery procedures does not detect any forwarding SSID $SSID_F$ (exit branch N of decision block 720), operation may return to decision block 710 (possibly, through delay block 715) for verifying that the conditions for switch to the asking extended mode are still valid. Alternatively, operation may return (loop back) to decision block 720 for re-iterating the discovery procedure. Preferably, a (fifth) discovery delay time period $T_{disc}$ is waited (dashed block 725) before re-iterating the discovery procedure (at decision block 720).

In case the discovery procedures detects at least one forwarding SSID $SSID_F$ (exit branch Y of decision block 720), for each forwarding SSID $SSID_F$, the metrics S_m, A_m and R_m associated with the corresponding FWD AG 105A and/or 150C are acquired (block 730).

In an embodiment of the present invention, the considered AG 105B may acquire the metrics S_m, A_m and R_m in at least two different manners (preferably, the metrics S_m, A_m and R_m are stored in a memory element of the considered AG 105B). A first manner comprises exploiting the primitive get my metrics g_m_m for receiving the metrics S_m, A_m and R_m from the AG metrics repository 230 of the orchestrator 110. A second manner comprises obtaining the metrics S_m, A_m and R_m by decrypting the forwarding SSID $SSID_F$ (in order to do so the considered AG 105B should possess the secret key K used for the encryption).

It should be noted that, in case of failover, the considered AG 105B cannot communicate with the orchestrator 110 (the AG 105B being unable to exchange data with the network infrastructure 120), therefore the AG 105B can only decrypt the forwarding SSID(s) $SSID_F$ received from the FWD AG 105A and/or 150C in order to obtain the metrics S_m, A_m and R_m.

Conversely, in case of extension purpose or in case of limited network connectivity, the considered AG 105B is able to communicate with the orchestrator 110, and it is preferred acquiring the metrics S_m, A_m and R_m through the primitive get my metrics g_m_m, since the values of the metrics S_m, A_m and R_m stored in the AG metrics repository 230 of the orchestrator 110 are generally more reliable (i.e., such values are periodically updated) than the one stored in the forwarding SSID(s) $SSID_F$—generally, values of the metrics S_m, A_m and R_m in the AG metrics repository 230 are updated with a higher frequency than a frequency with which a forwarding SSID(s) $SSID_F$ and, accordingly, the values of the metrics S_m, A_m and R_m comprised therein, are updated.

The considered AG 105B preferably measures a signal quality Q associated with each forwarding SSID $SSID_F$ (e.g., the AG 105B measures a power of the received wireless signal comprising the forwarding SSID $SSID_F$ and preferably stores it in a memory element), which is preferably exploited as a further data regarding the network resources available for sharing in selecting preferred FWD AG 105A and/or 150C (as described in the following).

In an embodiment of the invention, the procedure is configured for discarding any $SSID_S$, comprising any forwarding $SSID_S$ $SSID_F$, associated with a signal quality Q below a predetermined level. For example, any SSID, particularly any forwarding SSID $SSID_F$, associated with a power equal to, or lower than, a minimum power threshold $Q_{min}$ (e.g., $Q_{min} \leq -75$ dBm) is not considered (i.e., the signal power received at the considered AG 105B is too low for ensuring an effective network connectivity).

Based on the acquired parameters (e.g., the metrics S_m, A_m and R_m, and the signal quality Q) the considered AG 105B selects (block 735) a preferred FWD AG 105A and/or 150C to which to ask for network resources (as described in the following).

Once selected the preferred FWD AG 105A and/or 105C made an association with a 'discovered' forwarding SSID $SSID_F$, it is checked whether such preferred FWD AG 105A and/or 105C is a first AG to which the considered AG 105B tries to connect (decision block 740).

In the affirmative case (exit branch Y of decision block 740), i.e. the preferred FWD AG 105A and/or 105C is the first to which the considered AG 105B tries to connect, the considered AG 105B attempts to establish a connection (block 745) with the preferred FWD AG 105A and/or 105C and operation proceeds at block 750 described below.

In the negative case (exit branch N of decision block 740), i.e. the preferred FWD AG 105A and/or 105C is not the first to which the considered AG 105B tries to connect, it is checked whether the forwarding SSID $SSID_F$ corresponds to a previous forwarding SSID $SSID_F$ (decision block 755) already discovered and selected (e.g., in a previous iteration of the asking procedure according to an embodiment of the present invention). In other words, at decision block 755 it is checked whether the considered AG 105B has previously connected to the preferred FWD AG 105A and/or 105C for receiving network resources therefrom.

In the negative case (exit branch N of decision block 755), i.e. the forwarding SSID $SSID_F$ does not correspond to a previous forwarding SSID $SSID_F$, operation proceeds at block 745 where the considered AG 105B attempts to establish a connection (block 745) with the preferred FWD AG 105A and/or 105C.

In the affirmative case (exit branch Y of decision block 755), i.e. the forwarding SSID $SSID_F$ corresponds to a previous forwarding SSID $SSID_F$, the considered AG 105B should be already connected to the preferred FWD AG 105A and/or 105C for receiving network resources therefrom and operation proceeds at block 750 described hereinbelow.

The establishment of a connection between the considered AG 105B and the preferred FWD AG 105A and/or 105C is checked (decision block 750).

In case the connection between the considered AG 105B and the preferred FWD AG 105A and/or 105C is not established (exit branch N of decision block 750), the forwarding SSID $SSID_F$ is blacklisted (block 760) preferably for a predetermined period of time TBL (e.g., until the considered AG 105B establishes a connection with an available FWD AG 105A and/or 105C) and operation returns to decision block 720 (or alternatively to block 735) for repeating the search of a preferred FWD AG 105A and/or 105C excluding the FWD AG 105A or 105C associated with the blacklisted forwarding SSID $SSID_F$ to which the considered AG 105B was not able to connect.

In case the connection between the considered AG 105B and the preferred FWD AG 105A and/or 105C is established (exit branch Y of decision block 750), the considered AG 105B is considered an ASK AG 105B and it is checked (decision block 765) whether the ASK AG 105B switched to the asking extended mode following a failover.

In the negative case (exit branch N of decision block 765), i.e. the ASK AG 105B is asking network resources due to an extension, operation proceeds to block 770 described in the following.

In the affirmative case (exit branch Y of decision block 765), i.e. the ASK AG 105B is asking network resources due to a failover, the established communication with the preferred FWD AG 105A and/or 105C is exploited first to retrieve (block 775) the (updated) values of the metrics S_m, A_m and R_m stored in the AG metrics repository 230 of the orchestrator 110 referred to the preferred FWD AG 105A and/or 105C.

The values of the metrics S_m, A_m and R_m retrieved from the orchestrator 110 are compared with the values obtained through the decryption of the forwarding SSID $SSID_F$ associated with the preferred FWD AG 105A and/or 105C. Preferably, it is checked (decision bloc 780) whether the values of the metrics S_m, A_m and R_m retrieved from the orchestrator 110 match (possibly, within a predetermined tolerance range; even more preferably, the comparison of values of the metrics S_m, A_m and R_m is based on fuzzy logic criteria in order to improve a convergence of the system 100) the values obtained through the decryption of the forwarding SSID $SSID_F$.

In the negative case (exit branch N of decision block 780), i.e. retrieved and decrypted values of the metrics S_m, A_m and R_m do not match, operation proceeds to block 760 where the forwarding SSID $SSID_F$ is temporarily blacklisted as described above.

In the affirmative (exit branch Y of decision block 780), i.e. retrieved and decrypted values of the metrics S_m, A_m and R_m match, the ASK AG 105B exploits the network resources offered by the preferred FWD AG 105A and/or 105C for serving (i.e., providing network connectivity to) the UE 115B connected to the ASK AG 105B.

Periodically, it is further checked whether the asking extended mode has to be updated in order to cope with any possible change in the overall system 100 (particularly, in the network resources usage).

Accordingly, in an embodiment of the invention, it is checked (decision block 785) whether the ASK AG 105B is in the asking extended mode for a time period Δt equal to, or greater than, a predetermined asking threshold time period $TH_{ASK}$ (i.e., $\Delta t \geq TH_{ASK}$).

In the negative case (exit branch N of decision block 785), i.e. the time period Δt is lower than the predetermined asking threshold time period $TH_{ASK}$ (i.e., $\Delta t < TH_{ASK}$), operation loops back at block 770 in order that the ASK AG 105B continues to exploit the network resources offered by the preferred FWD AG 105A and/or 105C for serving the UE 115B connected to the ASK AG 105A and/or 105C.

In the affirmative (exit branch Y of decision block 785), i.e. the time period Δt is equal to, or greater than, a predetermined asking threshold time period $TH_{ASK}$ (i.e., $\Delta t \geq TH_{ASK}$), operation returns to block 710 for reiterating the asking extended mode procedure just described.

The selection of the preferred FWD AG 105A and/or 105C identified by a respective forwarding SSID $SSID_F$ according to an embodiment of the invention is now described.

Preferably, although not limitatively, the selection of the preferred FWD AG 105A and/or 105C implements Multi-Criteria Decision Aid, or MCDA, which generally provides a framework for identifying a problem (i.e., selecting the preferred FWD AG 105A and/or 105C) and the assessment, interpretation and validation of solutions to said problem based on information (e.g., metrics S_m, A_m and R_m, and signal quality Q) provided, and one or more rules (e.g., defined by the ISP providing the system 100).

In an embodiment of the invention, an ordinal criterion is defined and exploited for ordering the (physical) quantities (e.g., metrics S_m, A_m and R_m and signal quality Q) associated with each forwarding SSID $SSID_F$ identified during the discovery.

Preferably, although not limitatively, a simple implementation of the ordinal criterion comprises building an ordinal sequence, not necessarily having a numbered order and/or being continuous, which allows assessing that a quantity value is (conceptually, i.e. has a higher relevance for selecting the preferred FWD AG 105A and/or 105C, even though not necessarily numerically) greater than another quantity value.

Accordingly, fuzzy logics may be successfully implemented for carrying out the selection of the preferred FWD AG 105A and/or 105C. Advantageously, the exploitation of a fuzzy logic allows comparing ranges of values rather than punctual values of quantities.

The following Table 1 shows ordinal sequences for quantities exploited in selecting the preferred FWD AG 105A and/or 105C according to an exemplary embodiment of the invention:

TABLE 1

| Metric | Weight | Range | Range ID | Order |
|---|---|---|---|---|
| Speed (S_m) | $W_{Sp} = 0.7$ | ≤7 Mbps | $Sp_A$ | $Sp_A < Sp_B <$ |
|  |  | 7 ÷ 20 Mbps | $Sp_B$ | $Sp_C < Sp_D <$ |
|  |  | 20 ÷ 50 Mbps | $Sp_C$ | $Sp_E$ |
|  |  | 50 ÷ 90 Mbps | $Sp_D$ |  |
|  |  | ≥90 Mbps | $Sp_E$ |  |
| Ranking (R_m) | $W_R = 0.8$ | ≤25 | $R_{Low}$ | $R_{Low} <$ |
|  |  | 25 ÷ 50 | $R_{Medium-Low}$ | $R_{Medium-Low} <$ |
|  |  | 50 ÷ 75 | $R_{Medium-High}$ | $R_{Medium-High} <$ |
|  |  | 75 ÷ 100 | $R_{High}$ | $R_{High}$ |
| Availability (A_m) | $W_A = 1$ | ≤15' | $A_{Short}$ | $A_{Short} <$ |
|  |  | 15' ÷ 30' | $A_{Medium-Short}$ | $A_{Medium-Short} <$ |
|  |  | 30' ÷ 60' | $A_{Medium-Long}$ | $A_{Medium-Long} <$ |
|  |  | ≥60' | $A_{Long}$ | $A_{Long}$ |
| Signal Quality (Q) | $W_Q = 0.6$ | ≤−70 dBm | $Q_{Weak}$ | $Q_{Weak} < Q_{Fair} <$ |
|  |  | −70 ÷ −60 dBm | $Q_{Fair}$ | $Q_{Good} <$ |
|  |  | −60 ÷ −50 dBm | $Q_{Good}$ | $Q_{Excellent}$ |
|  |  | ≥−50 dBm | $Q_{Excellent}$ |  |
| Extra 1 (E1) | $W_{E1} = \ldots$ | ... | ... | ... |
| Extra 2 (E2) | $W_{E2} = \ldots$ | ... | ... | ... |

In Table 1 above, tor the speed quantity (comprised in the speed metric S_m) five ranges $Sp_{A-E}$ have been defined based on a bit rate computed, for example, in Mbps. Such five ranges $Sp_{A-E}$ are preferably ordered form the range having the lowest bit rate to the range having the highest bit rate. Similarly, also for the ranking, availability and signal quality a plurality (e.g., four) ranges have been defined in which values of the ranking, availability and signal quality comprised in the metrics A_m, R_m and signal quality measurements may fall.

It should be noted that also quantities comprised in the extra parameters Ext1 and/or Ext2 may be exploited in selecting the preferred FWD AG 105A and/or 105C.

Based on the classification accounted for in Table 1, the values of the metrics S_m, A_m, R_m and signal quality Q for each forwarding SSID $SSID_F$ are analyzed an associated with a corresponding quantity range.

In an embodiment of the invention, a respective weight $W_x$ (where x={Sp, R, A, Q, E1, E2} as shown in Table 1) for each one of the quantities is defined and exploited in order to compare values of the metrics S_m, A_m and R_m and signal quality Q of discovered forwarding $SSID_S$ $SSID_F$.

For example, a score Sc for each forwarding SSID $SSID_F$ is determined based upon the weights $W_x$. The score Sc of a considered forwarding SSID $SSID_F$ is increased by the corresponding weight $W_x$ for each one of the values of the metrics S_m, A_m, R_m, and signal quality Q, whether such value is comprised in a range higher than one or more other forwarding SSID $SSID_F$ (i.e., the first forwarding SSID $SSID_F$ 'dominates' one or more other forwarding SSID $SSID_F$). At the same time, the score Sc of all other forwarding $SSID_S$ $SSID_F$ (i.e., the forwarding $SSID_S$ $SSID_F$ 'dominated' by the considered forwarding SSID $SSID_F$) is decreased by the same weight $W_x$.

The forwarding $SSID_S$ $SSID_F$ are then ordered based on their respective score, and the FWD AG 105A and/or 105C associated with the forwarding SSID $SSID_F$ with the highest score Sc is selected as preferred FWD AG 105A and/or 105C.

A selection of a preferred FWD AGs, such as preferred FWD AGs 105A and/or 105C considered above, according to an embodiment of the invention is now described for the sake of clarity.

In the example considered in the following, five (5) forwarding $SSID_S$ $SSID_{F1-5}$ have been discovered during the asking extended mode procedure by a generic ASK AG, such as the ASK AG 105B considered above. Table 2 lists the values of the metrics S_m, A_m and R_m and signal quality Q associated with the forwarding $SSID_S$ $SSID_{F1-5}$ (e.g., comprised in the memory element of the ASK AG 105B):

TABLE 2

| $SSID_F$ | S_m | R_m | A_m | Q |
|---|---|---|---|---|
| $F_1$ | 15 | 50 | 30 | −65 |
| $F_2$ | 70 | 80 | 30 | −50 |
| $F_3$ | 60 | 70 | 60 | −40 |
| $F_4$ | 100 | 90 | 15 | −65 |
| $F_5$ | 7 | 20 | 90 | −55 |

In Table 2 each term $F_{1-5}$ indicate a corresponding forwarding $SSID_S$ $SSID_{F1-5}$.

Each value of the metrics S_m, A_m, R_m and signal quality Q of the forwarding SSID $SSID_{S_{F1-5}}$ is analyzed and associated with a corresponding range:

TABLE 3

| $SSID_F$ | S_m | R_m | A_m | Q |
|---|---|---|---|---|
| $F_1$ | $Sp_B$ | $R_{Medium-Low}$ | $A_{Medium-Short}$ | $Q_{Fair}$ |
| $F_2$ | $Sp_D$ | $R_{High}$ | $A_{Medium-Short}$ | $Q_{Good}$ |
| $F_3$ | $Sp_D$ | $R_{Medium-High}$ | $A_{Long}$ | $Q_{Excellent}$ |
| $F_4$ | $Sp_E$ | $R_{High}$ | $A_{Short}$ | $Q_{Fair}$ |
| $F_5$ | $Sp_A$ | $R_{Low}$ | $A_{Long}$ | $Q_{Good}$ |

Based on the classification of values of the metrics S_m, A_m, R_m and signal quality Q shown in Table 3 order chains may be composed and partial scores ΔSc (i.e., partial scores based on comparisons of values of only one among metrics S_m, A_m, R_m and signal quality Q):

TABLE 4

| Parameter | Weight | Order chain | ΔScore |
|---|---|---|---|
| S_m | $W_S = 0.7$ | $F_4 \rightarrow F_2, F_3 \rightarrow F_1, F_5$ | $\Delta F_{Sp,\,1} = -0.7 - 0.7 = -1.4$ |
| | | | $\Delta F_{Sp,\,2} = -0.7 + 0.7 = 0$ |
| | | | $\Delta F_{Sp,\,3} = -0.7 + 0.7 = 0$ |
| | | | $\Delta F_{Sp,\,4} = +0.7 + 0.7 = +1.4$ |
| | | | $\Delta F_{Sp,\,5} = -0.7 - 0.7 = -1.4$ |
| R_m | $W_R = 0.8$ | $F_2, F_4 \rightarrow F_3 \rightarrow F_1 \rightarrow F_5$ | $\Delta F_{R,\,1} = -0.8 + 0.8 = 0$ |
| | | | $\Delta F_{R,\,2} = +0.8$ |
| | | | $\Delta F_{R,\,3} = -0.8 - 0.8 + 0.8 = -0.8$ |
| | | | $\Delta F_{R,\,4} = +0.8$ |
| | | | $\Delta F_{R,\,5} = -0.8$ |
| A_m | $W_A = 1$ | $F_3, F_5 \rightarrow F_1, F_2 \rightarrow F_4$ | $\Delta F_{A,\,1} = -1 + 1 = 0$ |
| | | | $\Delta F_{A,\,2} = -1 + 1 = 0$ |
| | | | $\Delta F_{A,\,3} = +1$ |
| | | | $\Delta F_{A,\,4} = -1$ |
| | | | $\Delta F_{A,\,5} = +1$ |
| Q | $W_Q = 0.6$ | $F_3 \rightarrow F_2, F_5 \rightarrow F_1, F_4$ | $\Delta F_{Q,\,1} = -0.6 - 0.6 = -1.2$ |
| | | | $\Delta F_{Q,\,2} = -0.6 + 0.6 + 0.6 = +0.6$ |
| | | | $\Delta F_{Q,\,3} = +0.6$ |
| | | | $\Delta F_{Q,\,4} = -0.6 - 0.6 = -1.2$ |
| | | | $\Delta F_{Q,\,5} = -0.6 + 0.6 + 0.6 = +0.6$ |

In Table 4 the arrow symbol → means that the forwarding SSID $SSID_{Fy}$ (with y=1, ..., 5) preceding the arrow symbol dominates (i.e., outperforms) the forwarding SSID(s) $SSID_{Fy'}$ (with y'=1, ..., 5; and y≠y') following the arrow symbol with respect to the considered metric S_m, A_m, R_m or signal quality Q.

For example, by considering the speed metric S_m, the $SSID_{F4}$ dominates $SSID_{F2}$ and $SSID_{F3}$, which in their turn dominate over $SSID_{F1}$ and $SSID_{F5}$ (which are thus also dominated by $SSID_{F4}$).

Once the order chains and the partial scores ΔSc are determined for the metrics S_m, A_m, R_m and signal quality Q, the preferred FWD AG may be selected.

Preferably, the preferred FWD AG is associated with the forwarding SSID $SSID_{F1-5}$ the highest score Sc, which is determined as the sum of all the partial scores ΔSc associated with the same forwarding SSID $SSID_{F1-5}$.

For example, Table 5 shows the scores Sc computed for the forwarding SSIDs $SSID_{F1-5}$ based on the partial scores ΔSc shown in Table 4:

TABLE 5

| SSID | S_m | R_m | A_m | Q | Partial scores: $\Delta S_{Sp,\,i}, \Delta S_{R,\,i}, \Delta S_{A,\,i}, \Delta S_{Q,\,i}$ | Score = $\Delta S_{Sp,\,i} + \Delta S_{R,\,i} + \Delta S_{A,\,i} + \Delta S_{Q,\,i}$ | Selection Order |
|---|---|---|---|---|---|---|---|
| $F_1$ | 15 | 50 | 30 | −65 | −1.4, 0, 0, −1.2 | −2.6 | 5 |
| $F_2$ | 70 | 80 | 30 | −50 | 0, +0.8, 0, +0.6 | +1.4 | 1 |
| $F_3$ | 60 | 70 | 60 | −40 | 0, −0.8, +1, +0.6 | +0.8 | 2 |
| $F_4$ | 100 | 90 | 15 | −65 | +1.4, +0.8, −1, −1.2 | 0 | 3 |
| $F_5$ | 7 | 20 | 90 | −55 | −1.4, −0.8, +1, +0.6 | −0.6 | 4 |

By considering Table 5 it results that $SSID_{F2}$ has the highest score, i.e. $Sc_2=1.4$ among the forwarding SSID $SSID_{F1-5}$ and, accordingly, the FWD AG associated with the $SSID_{F2}$ is selected as the preferred FWD AG.

It should be noted that the selection procedure described above depends on the values assigned to the weights $W_S$, $W_R$, $W_A$, and $W_Q$, which may be changed and/or adjusted in order to meet ISP and/or subscribers needs without departing from the scope of the invention.

Similarly as described above, the weights $W_S$, $W_R$, $W_A$, and $W_Q$ may be selected according to a business logic (or domain logic, i.e. the part of the program that encodes business rules that determine how data can be created, stored, and changed within the system 100) implemented in the system 100.

Preferably, for assigning the values of weights $W_S$, $W_R$, $W_A$, and $W_Q$ the corresponding metrics S_m, A_m, R_m and signal quality Q are firstly listed based on an 'importance' e.g., according to MCDA—Multi Criteria Decision Aid criteria, ISP guidelines (e.g., aimed at achieving predetermined performance of the system 100 and/or of the network infrastructure 120) and/or analysis of data obtained by actual and/or simulated operation of the system 100. Subsequently, the values of weights $W_S$, $W_R$, $W_A$, and $W_Q$ are assigned according to the order in the list of the corresponding metrics S_m, A_m, R_m or signal quality Q (e.g., the values decreasing from a highest value to a lowest value descending the list).

In the non-limiting example of Table 1, the values of weights $W_S$, $W_R$, $W_A$, and $W_Q$ have been assigned as follows. The availability metric A_m has been considered of primary importance (since the availability of network resources for sharing may be considered the topmost requisite for selecting a preferred FWD AG), the ranking metric R_m has then been considered the second more important metric, followed by the speed metric S_m, while the signal quality has been considered the less relevant parameter to be considered in the selection of the preferred FWD AG. Accordingly, the availability weight $W_A$ has been assigned with the highest value, one in the example of Table 1 ($W_A=1$), ranking weight $W_R$ has been assigned with a lower value, 0.8 in the example considered ($W_R=0.8$), speed weight $W_S$ has been assigned with an even lower value, 0.7 in the example considered ($W_S=0.7$), and signal quality weight $W_Q$ has been assigned with the lowest value, 0.6 in the example considered ($W_Q=0.6$).

It should be apparent, that the actual values assigned to each one of weights $W_S$, $W_R$, $W_A$, and $W_Q$ may be selected in order to 'tune' the influence of each one of weights $W_S$, $W_R$, $W_A$, and $W_Q$, with respect to the other weights, in the selection of the preferred FWD AG. Preferably, analysis of data obtained by actual and/or simulated operation of the system 100 may be exploited for determining and/or updating best-fitting values for achieving desired performance of the system 100.

In general, the skilled person would clearly understand that the same solutions for operating the AGs 105A-C comprised in the system 100 in forwarding and/or asking extended mode may be implemented by equivalent procedures (performing similar actions with the same functions of several actions or portions thereof, by omitting some non-essential actions, or by performing additional optional actions); moreover, the actions may be performed in different order, in parallel or overlapped (at least in part).

In an embodiment of the invention, in case communications between the ASK AG 105A-C and the preferred FWD AG 105A-C fails or is abruptly interrupted, the system 100 is configured for automatically restarting the automatic procedure.

In a further embodiment, the system 100 is configured for exiting the asking extended mode and, possibly, returning to the basic mode upon receiving an interrupt signal that may be issued, for example, by a user (i.e., an owner of the AG 105A-C) or by the ISP (e.g., in order to reset the AG 105A-C in response to anomalies and/or instability in the operation thereof).

Moreover, even though in the above description of embodiments of the present invention a single connection between a FWD AG and an ASK AG has been disclosed, nothing prevents to configure the system 100 for allowing multiple connections among the AGs at once. For example, a FWD AG may share network resources with two or more ASK AGs (e.g., in case a FWD AG having a very large band, such as in case the the FWD AG implements Fiber data transmission technology) and/or an ASK AG may receive network resources from two or more FWD AGs (e.g., in order to receive a sufficient total amount of network resources without reducing the performance of the FWD AGs sharing a portion of their network resources). It should be noted that configuring the system 100 for managing multiple connections does not requires substantial changes to the orchestrator 110B, the AGs 105A-C or, more generally, to the system 100 described above.

In summary, thanks to the large amount of data collected regarding the AGs 105A-C and the network infrastructure 120, and the data mining implemented thereon according to the present invention, it is possible to estimate with high accuracy the network resources usage and a sharing thereof as a function of time.

The data mining performed by the system 100 according to the present invention provides an amount of useful data that allows identifying assessment and real-time rules. The assessment rules may comprise usage patterns of network resources (i.e. network resources exploitation behavior of the subscriber associated with the AGs 105A-C) that allow forecasting the network resources availability associated with the AGs 105A-C as a function of time. Moreover, the real-time rules allow substantially preemptively, or at least in real-time, identifying changes in the (assessed) usage patterns of network resources, for example data mining based on the analysis of most recent information (e.g., information acquired in real-time or in near real-time) allows defining real-time rules that highlight variations from assessed behaviors assessed by assessment rules.

Thanks to the in-depth knowledge of the availability of network resources thus acquired, the sharing of network resources may be managed in an optimized way, allowing to provide a highly reliable network connectivity capable to satisfy the network connectivity required by the subscribers that connect their UE 115A-C to the respective AGs 105A-C, substantially regardless of the current network resources actually available to the AGs 105A-C.

The provision of the orchestrator 110 substantially reduces the computational effort required to the AGs 105A-C in order to manage the network resources sharing and allows for the in-depth knowledge of the availability of network resources mentioned above.

This reduces the constraints on the hardware, firmware and/or software with which the AGs 105A-C need to be equipped in order to identify and select FWD AGs 105A-C when in asking extended mode, and assess whether it is convenient entering the forwarding asking mode.

Particularly, the implementation of the system 100 according to embodiments of the present invention does not require substantial modification to a MAC layer of the Protocol Stack used for the communication network.

It should be noted that FWD AGs 105A-C need only to communicate the respective $SSID_F$ through wireless communication (e.g., based on WiFi technology) before initiating a network resource sharing, without the need for suspending and/or limiting the provision of network resources to the respective served UE 115A-C (i.e., the system 100 may operate in a transparent manner to the subscribers).

Finally, it should be noted that in the system 100 according to the present invention the FWD AGs 105A-C may simply manage the provision of network resources to ASK AGs 105A-C as any other networking devices (e.g., UE 115A-C) that connects thereto. In other words, ASK AGs 105A-C connect to FWD AGs 105A-C in the same way as a UE 115A-C connects to the latter. Accordingly, the AGs 105A-C do not need substantial changes in their structure and/or configuration in order to operate as FWD AGs 105A-C.

The invention claimed is:

1. A method of managing a sharing of network resources between at least two access gateways, each connected to a network infrastructure and arranged for providing network connectivity to respective user equipment, the method comprising having a first access gateway:
assessing whether a portion of network resources are available for sharing with a second access gateway;
in response to assessing the portion of network resources are available for sharing:
generating a dedicated access gateway identifier univocally identifying the at least one first access gateway as operating in a forwarding mode to share the network resources available for sharing and comprising data regarding the network resources available for sharing;
broadcasting the dedicated access gateway identifier;
receiving a request for sharing network resources from the second access gateway;
providing the portion of network resources available for sharing to the second access gateway;
and wherein generating the dedicated access gateway identifier comprises having the at least one first access gateway: requesting to an orchestrator network entity provided in the network infrastructure information regarding the network resources available for sharing, the information regarding the network resources available for sharing being based on a weighted combination of information regarding operation of the at least two access gateways, newer information regarding operation of the at least two access gateways being weighted higher than information regarding operation of the at least two access gateways that is older than the newer information regarding operation of the at least two access gateways; receiving said information regarding the network resources available for sharing from the orchestrator network entity;

and encoding said information regarding the network resources available for sharing in the dedicated access gateway identifier, wherein the method further comprises having the orchestrator network entity:

receive the access gateway identifier, decrypt the dedicated access gateway identifier in order to extract an access gateway metric:

compare the access gateway metric from the dedicated access gateway identifier with a corresponding access gateway metric determined by the orchestrator network entity;

and in response to detecting a correspondence during said comparison, store the dedicated access gateway identifier.

2. The method of claim 1, wherein the weighting the information regarding the operation of the at least two access gateways is performed using weights based on an exponential distribution.

3. The method of claim 1, wherein assessing whether a portion of network resources are available for sharing with a second access gateway comprises: identifying usage patterns of the at least two access gateways, wherein the usage patterns allow definition of an availability of network resources as a function of time.

4. The method according to claim 1, wherein where a mismatch is detected during said comparison, the orchestrator entity requests re-calculation of the dedicated access gateway identifier to the at least one first access gateway univocally identified by the dedicated access gateway identifier.

5. The method according to claim 1, wherein the dedicated access gateway identifier is a dedicated forwarding service set identifier.

6. A method of managing a sharing of network resources between at least two access gateways, each connected to a network infrastructure and arranged for providing network connectivity to respective user equipment, the method comprising having a first access gateway:

assessing whether additional network resources are required for providing network connectivity to respective user equipment;

in response to assessing additional network resources are required:

receiving at least one dedicated access gateway identifier univocally identifying a respective second access gateway as operating in a forwarding mode to share the network resources available for sharing; acquiring information regarding the network resources available for sharing by the second access gateway, the information regarding the network resources available for sharing being based on a weighted combination of information regarding operation of the at least two access gateways, newer information regarding operation of the at least two access gateways being weighted higher than information regarding operation of the at least two access gateways that is older than the newer information regarding operation of the at least two access gateways; selecting the second access gateway as provider of the additional network resources based on the data regarding the network resources available for sharing thereof; and connecting to the second access gateway for receiving network resources available for sharing; and wherein acquiring data regarding the network resources available for sharing by the second access gateway comprises one between: decoding the data regarding the network resources available for sharing received from the access gateway identifier of the second access gateway; and requesting the data regarding the network resources available for sharing by the second access gateway to an orchestrator network entity provided in the network infrastructure and receiving said data regarding the network resources available for sharing by the second access gateway from the orchestrator network entity, wherein the method further comprises having the orchestrator network entity: receive the access gateway identifier, decrypt the dedicated access gateway identifier in order to extract an access gateway metric: compare the access gateway metric from the dedicated access gateway identifier with a corresponding access gateway metric determined by the orchestrator network entity; and in response to detecting a correspondence during said comparison, store the dedicated access gateway identifier.

* * * * *